United States Patent
Imamura et al.

(10) Patent No.: US 11,872,886 B2
(45) Date of Patent: Jan. 16, 2024

(54) DISPLAY SYSTEM FOR SWITCHING BETWEEN MODES THAT ASSOCIATE EMITTING STATES WITH REFLECTIVE STATES

(71) Applicant: Panasonic Intellectual Property Management Co., Ltd., Osaka (JP)

(72) Inventors: Norihiro Imamura, Osaka (JP); Kenji Nagatomi, Osaka (JP); Keiichi Matsuzaki, Kyoto (JP); Hirofumi Hoshida, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 18/101,424

(22) Filed: Jan. 25, 2023

(65) Prior Publication Data
US 2023/0302902 A1 Sep. 28, 2023

(30) Foreign Application Priority Data

Mar. 25, 2022 (JP) .................................. 2022-050149
Sep. 2, 2022 (JP) .................................. 2022-140196

(51) Int. Cl.
*B60K 35/00* (2006.01)
*G09G 3/36* (2006.01)
(Continued)

(52) U.S. Cl.
CPC ............... *B60K 35/00* (2013.01); *G09G 3/36* (2013.01); *B60K 2370/42* (2019.05);
(Continued)

(58) Field of Classification Search
CPC ......................... B60K 35/00; B60K 2370/42; B60K 2370/52; G09G 3/36; G09G 2330/027;
(Continued)

(56) References Cited

U.S. PATENT DOCUMENTS

2018/0345860 A1* 12/2018 Imamura ............ G02B 27/0025
2020/0231093 A1 7/2020 Kobayashi et al.
(Continued)

FOREIGN PATENT DOCUMENTS

JP 61-156031 7/1986
JP 06-102541 4/1994
(Continued)

OTHER PUBLICATIONS

Office Action from Japan Patent Office (JPO) in Japanese Patent Appl. No. 2022-140196, dated Jun. 27, 2023, together with an English language translation.

*Primary Examiner* — David D Davis
(74) *Attorney, Agent, or Firm* — GREENBLUM & BERNSTEIN, P.L.C.

(57) ABSTRACT

A display system includes a display device, an optical device, and an operation receiver. The display device is switchable between an emitting state where first image light is allowed to be emitted from the display device and a non-emitting state where the first image light is not allowed to be emitted from the display device. The optical device is switchable between a reflecting state where light coming from a back of the mobile body is reflected from the optical device and a transmitting state where the light passes through the optical device. The operation receiver switches between a first mode where the display device is in the emitting state while the optical member is in the transmitting state and a second mode where the display device is in the non-emitting state while the optical member is in the reflecting state.

20 Claims, 28 Drawing Sheets

(51) Int. Cl.
*G02B 5/00* (2006.01)
*G02F 1/137* (2006.01)

(52) U.S. Cl.
CPC .......... *B60K 2370/52* (2019.05); *G02B 5/003* (2013.01); *G02F 1/137* (2013.01); *G09G 2330/027* (2013.01); *G09G 2354/00* (2013.01); *G09G 2380/10* (2013.01)

(58) Field of Classification Search
CPC ........... G09G 2354/00; G09G 2380/10; G02B 5/003; G02F 1/137
See application file for complete search history.

(56) References Cited

U.S. PATENT DOCUMENTS

| 2021/0001778 A1 | 1/2021 | Oishi |
| 2021/0157202 A1 | 5/2021 | Kumeta |

FOREIGN PATENT DOCUMENTS

| JP | 2006-232212 | 9/2006 | |
| JP | 2019-174705 | 10/2019 | |
| JP | 2019-191288 | 10/2019 | |
| JP | 2020-052143 | 4/2020 | |
| JP | 2022-013652 | 1/2022 | |
| WO | 2017/203916 A1 | 11/2017 | |
| WO | 2019/106951 A1 | 6/2019 | |
| WO | WO-2019106951 A1 * | 6/2019 | ............... B60R 1/04 |

* cited by examiner

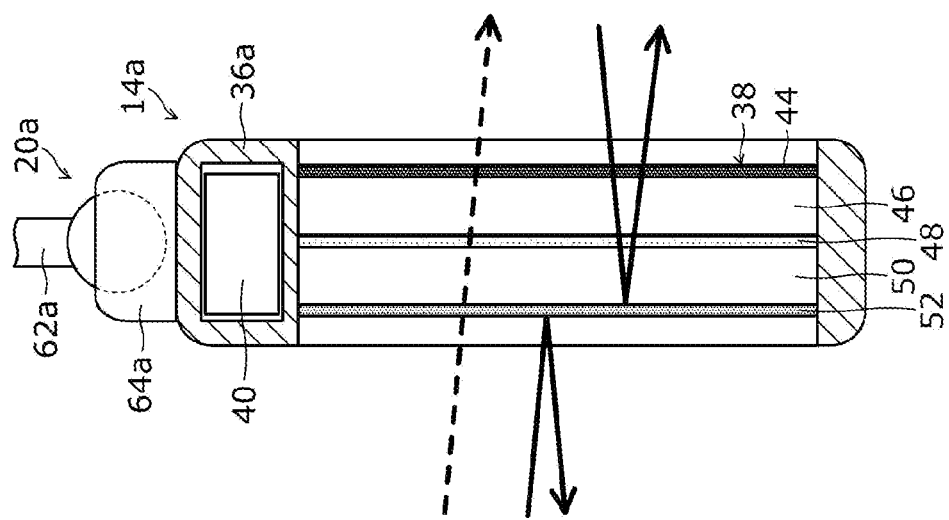

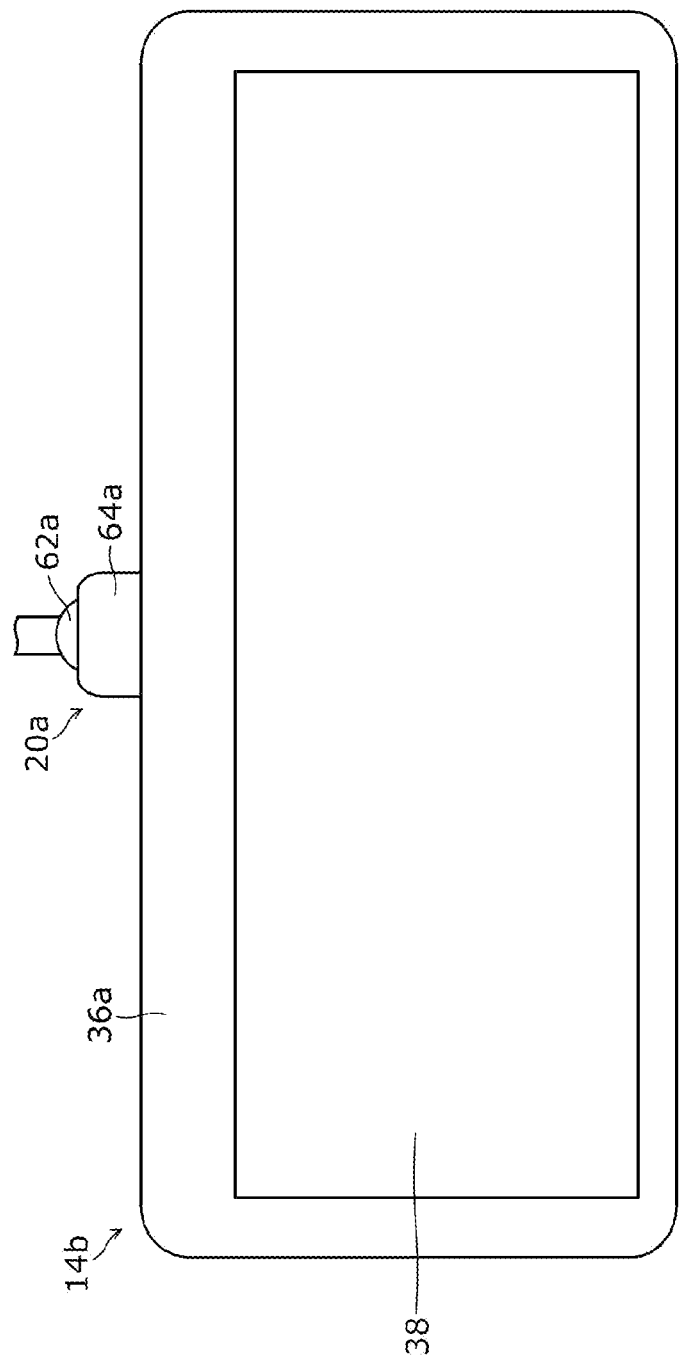

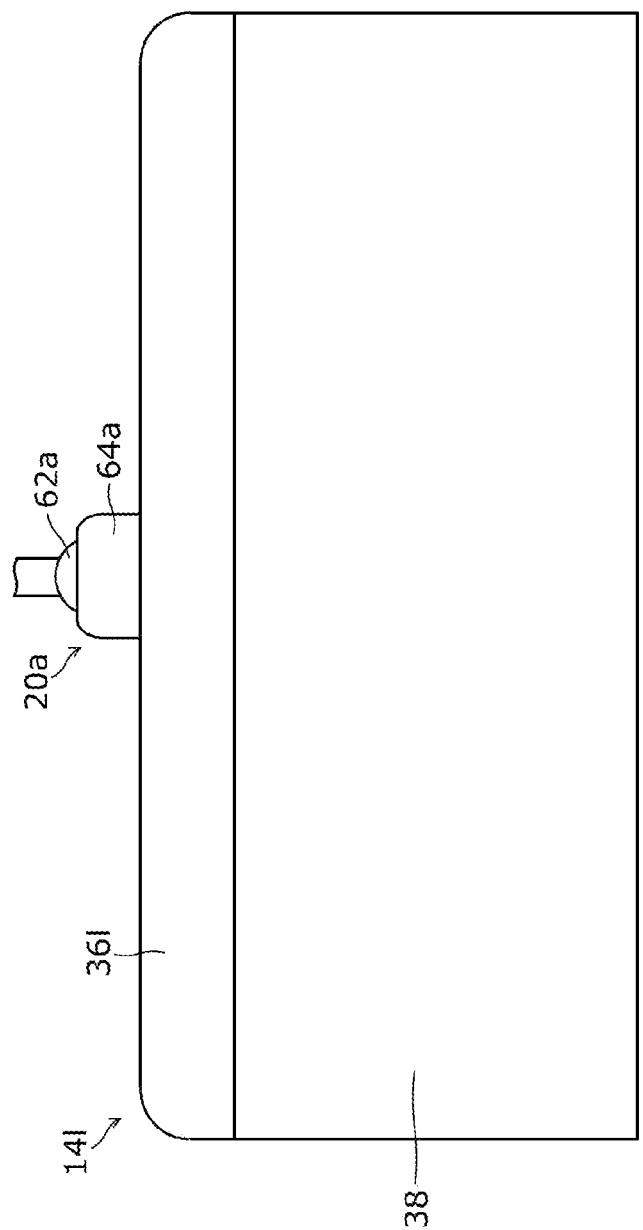

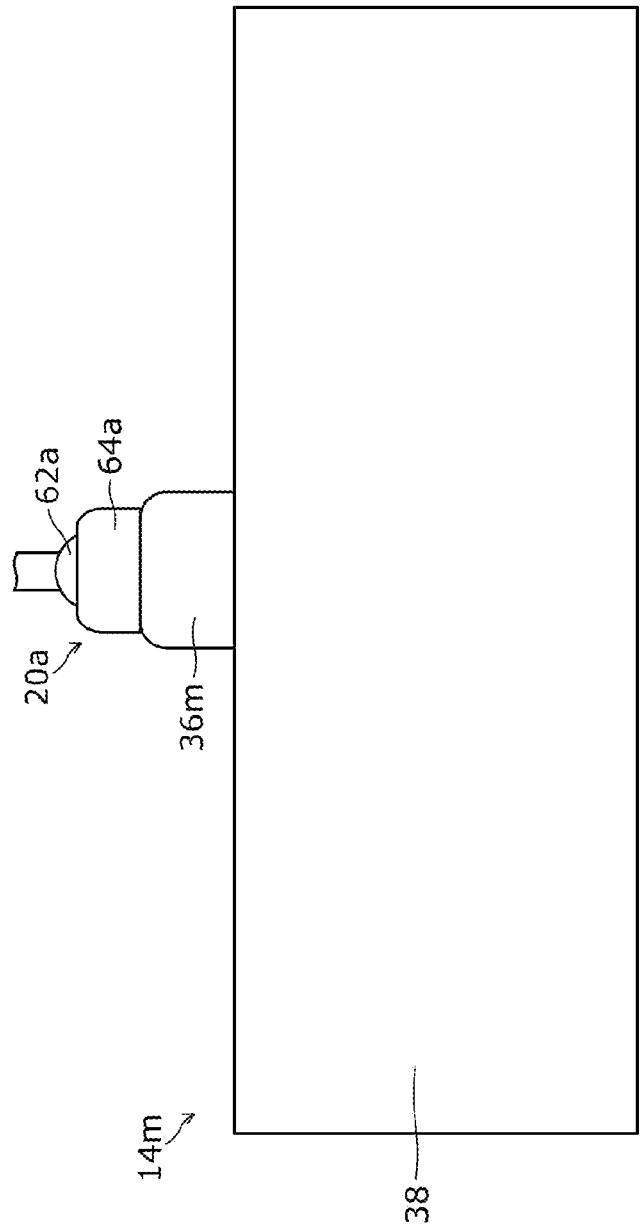

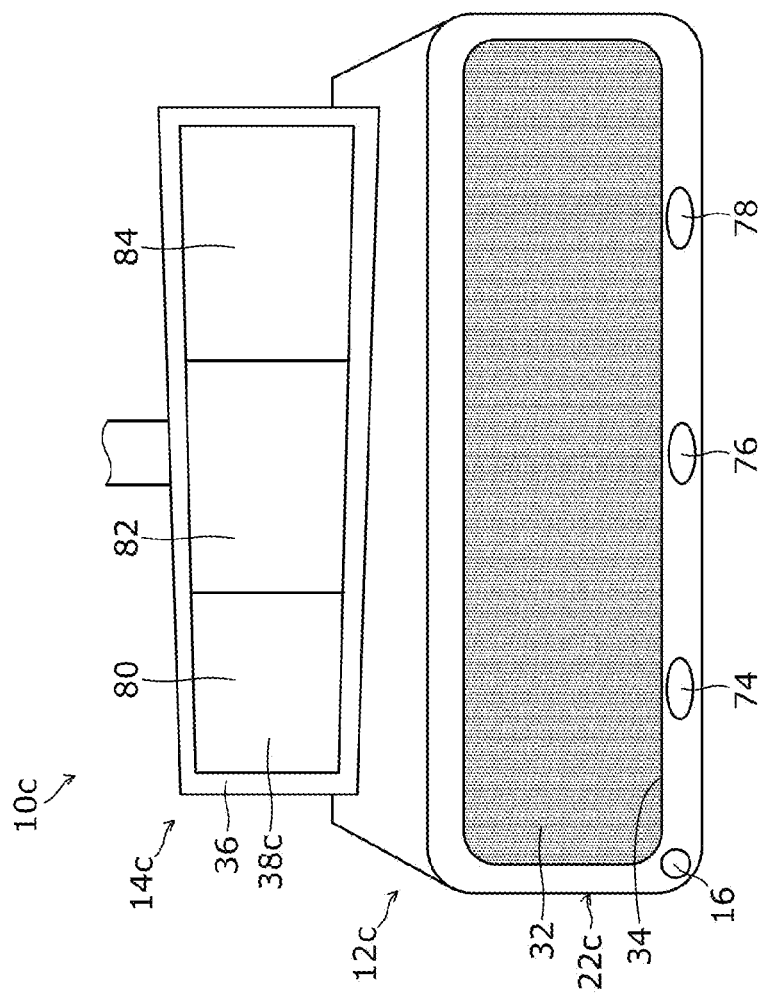

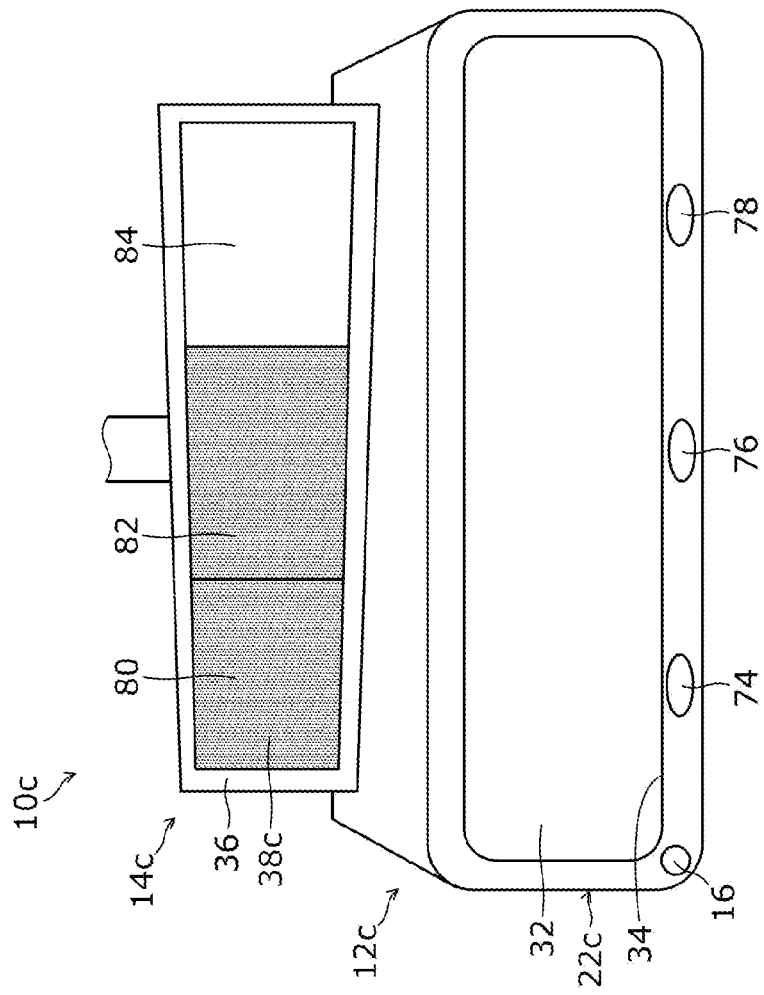

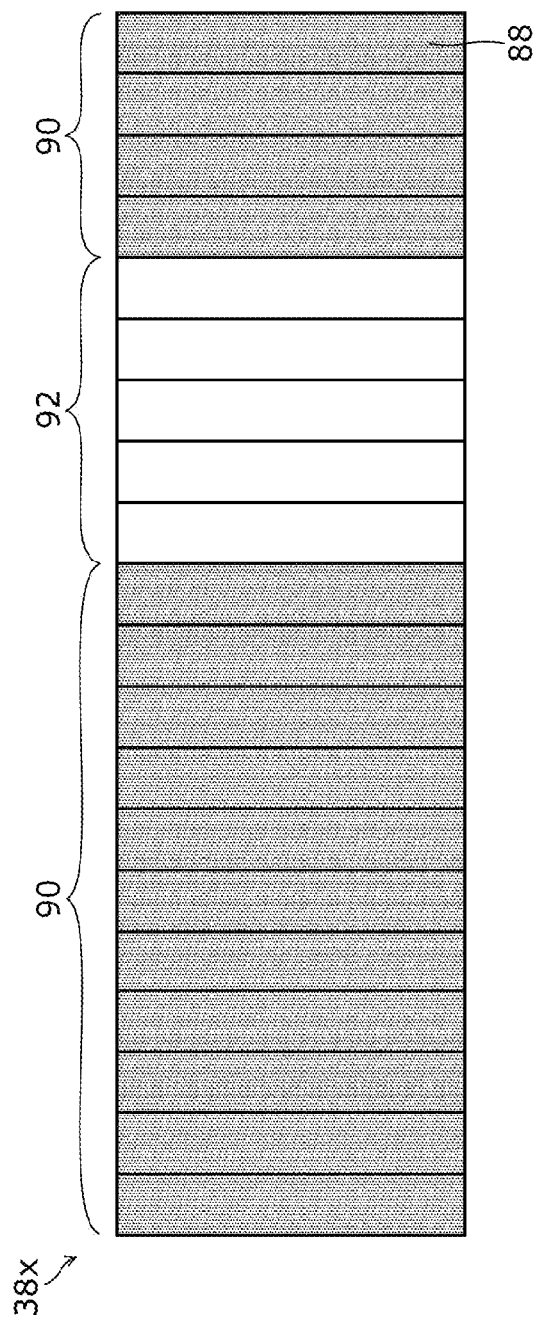

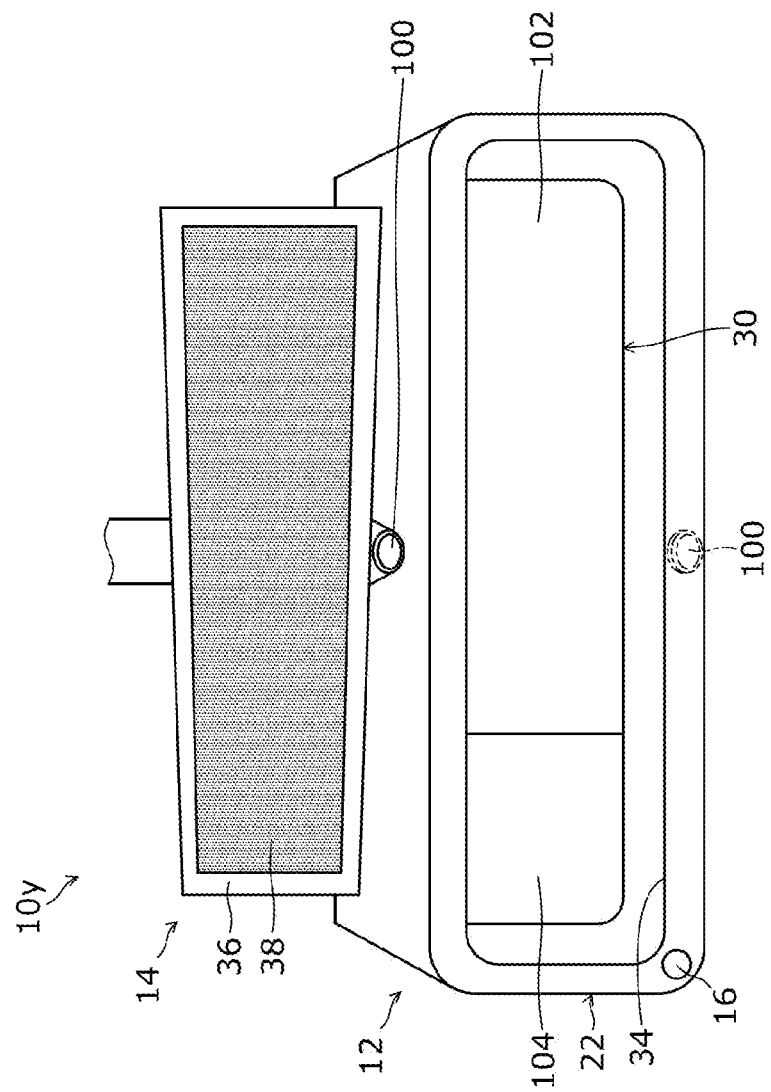

DISPLAY SYSTEM FOR SWITCHING BETWEEN MODES THAT ASSOCIATE EMITTING STATES WITH REFLECTIVE STATES

CROSS REFERENCE TO RELATED APPLICATIONS

The present application is based on and claims priority of Japanese Patent Application No. 2022-050149 filed on Mar. 25, 2022, and Japanese Patent Application No. 2022-140196 filed on Sep. 2, 2022.

FIELD

The present disclosure relates to display systems.

BACKGROUND

Display systems that display images are well known. As an example of such display systems, for example, Patent Literature (PTL) 1 discloses a vehicle display device that is switchable between being used for viewing a virtual image and being used as an optical rearview mirror.

CITATION LIST

Patent Literature

PTL 1: WO 2019/106951

SUMMARY

However, the vehicle display device according to PTL 1 can be improved upon.

In view of this, the present disclosure provides a display system capable of improving upon the above related art.

In accordance with an aspect of the present disclosure, a display system provided to a mobile body includes: a display device; an optical device; and an operation receiver. The display device includes an emission portion through which first image light forming a first image is emitted from the display device. The display device is switchable between (i) an emitting state where the first image light is allowed to be emitted from the display device through the emission portion and (ii) a non-emitting state where the first image light is not allowed to be emitted from the display device through the emission portion. The optical device includes an optical member. The optical member is switchable between (i) a reflecting state where the optical member reflects light coming from a back of the mobile body and (ii) a transmitting state where the light coming from the back of the mobile body passes through the optical member. The operation receiver receives an operation for switching the display system between (i) a first mode where the display device is in the emitting state while the optical member is in the transmitting state and (ii) a second mode where the display device is in the non-emitting state while the optical member is in the reflecting state.

A display system according to one aspect of the present disclosure is capable of improving upon the above related art.

BRIEF DESCRIPTION OF DRAWINGS

These and other advantages and features of the present disclosure will become apparent from the following description thereof taken in conjunction with the accompanying drawings that illustrate a specific embodiment of the present disclosure.

FIG. 7 is a side view of an optical device according to Embodiment 2.
FIG. 8B is a front view of the optical device in FIG. 8A.
FIG. 8D is a front view of the optical device in FIG. 8C.
FIG. 8F is a front view of the optical device in FIG. 8E.
FIG. 9 is a front view of a display system according to Embodiment 4.
FIG. 11 is a front view of the display system in FIG. 9 in yet another state.
FIG. 12B is a front view of an optical member in the display system in FIG. 12A.
FIG. 21B is a front view of the display system in FIG. 21A.

DESCRIPTION OF EMBODIMENTS

Figure 1:
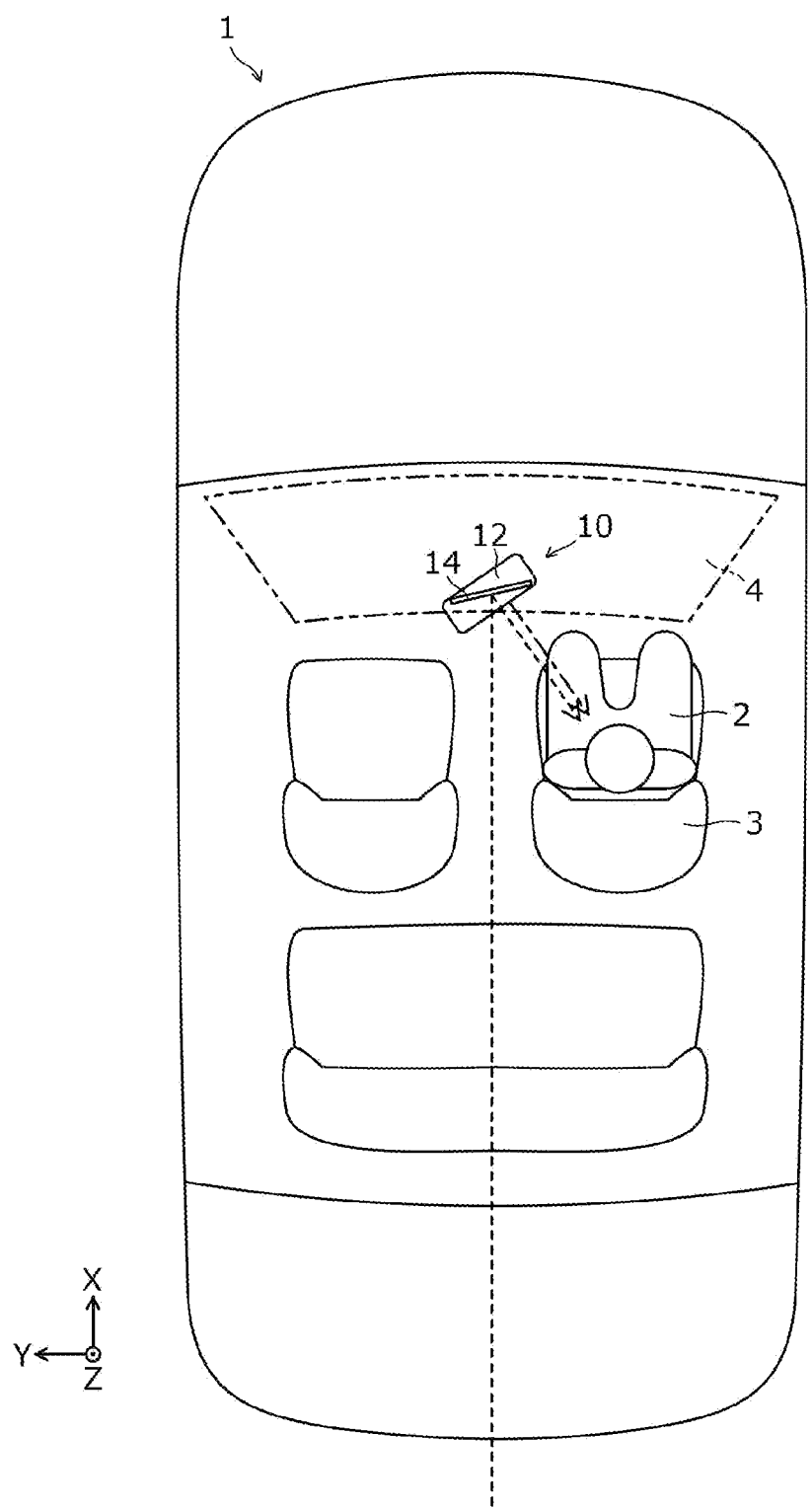
FIG. 1 is a plan view of a display system according to Embodiment 1.

The vehicle display device disclosed in PTL 1 takes time and effort to be switched between being used for viewing a virtual image and being used as an optical rearview mirror, and thus the usability reduces.

In view of this, the present disclosure provides a display system capable of preventing a reduction in usability.

In accordance with an aspect of the present disclosure, a display system provided to a mobile body includes: a display device; an optical device; and an operation receiver. The display device includes an emission portion through which first image light forming a first image is emitted from the display device. The display device is switchable between (i) an emitting state where the first image light is allowed to be emitted from the display device through the emission portion and (ii) a non-emitting state where the first image light is not allowed to be emitted from the display device through the emission portion. The optical device includes an optical member. The optical member is switchable between (i) a reflecting state where the optical member reflects light coming from a back of the mobile body and (ii) a transmitting state where the light coming from the back of the mobile body passes through the optical member. The operation receiver receives an operation for switching the display system between (i) a first mode where the display device is in the emitting state while the optical member is in the transmitting state and (ii) a second mode where the display device is in the non-emitting state while the optical member is in the reflecting state.

With this, the display system can be easily switched from the first mode to the second mode and from the second mode to the first mode in response to the operations on the operation receiver. This prevents a reduction in usability.

It is possible that the operation receiver includes: a first operation receiver that receives, as the operation, a first operation for switching the display system to the first mode; and a second operation receiver that receives, as the operation, a second operation for switching the display system to the second mode.

With this, the switching from the first mode to the second mode can be performed by the second operation receiver, and the switching from the second mode to the first mode can be performed by the first operation receiver. Thus, the switching from the first mode to the second mode and the switching from the second mode to the first mode can be performed by dedicated operation receivers. This further prevents a reduction in usability.

It is also possible that the operation receiver is a single push button.

With this, the display system can be switched from the first mode to the second mode or from the second mode to the first mode with a press on the single push button. This further facilitates the switching from the first mode to the second mode and the switching from the second mode to the first mode, thereby further preventing a reduction in usability.

It is further possible that the display device includes: a first display member that emits the first image light; a concave mirror that reflects the first image light emitted from the first display member; and a first housing that includes the emission portion and that holds the first display member and the concave mirror, the optical device further includes: a second housing that holds the optical member, the second housing being different from the first housing, and the first image light is emitted from the first display member, then reflected on the concave mirror, and emitted from the display device through the emission portion.

With this, the first image can be displayed to be located farther from a person in the mobile body. This reduces focus shift that occurs when the person looking forward of the mobile body looks at the first image, thereby further preventing a reduction in usability.

It is still further possible that the display system further includes: a first support structure; and a second support structure. The first support structure includes a first member and a second member. The second member engages with the first member to be pivotable on the first member and is secured to the first housing. The second support structure includes a third member and a fourth member. The fourth member engages with the third member to be pivotable on the third member and is secured to the second housing.

With this, the first housing can be pivoted such that the emission portion is disposed at a position where the first image light emitted through the emission portion is easily visible. Moreover, the second housing can be pivoted such that the optical member is disposed at a position where the light coming from the back of the mobile body and reflected by the optical member is easily visible. This further prevents a reduction in usability.

It is still further possible that the first member and the third member are integrally formed.

With this, the first member and the third member do not need to be secured to the mobile body separately. This saves time and effort to secure the first member and the third member to the mobile body and further prevents a reduction in usability.

Moreover, the third member may be secured to the first housing.

With this, the emission portion and the optical member can be disposed closer to each other. This causes the light coming from the back of the mobile body and reflected by the optical member to be more easily visible when the display system switches from the first mode to the second mode, and causes the first image light emitted through the emission portion to be more easily visible when the display system switches from the second mode to the first mode. Thus, a reduction in usability is further prevented.

Moreover, the first housing and the second housing may be secured to the mobile body through the first member and the third member, respectively, which are spaced from each other, and the third member may be located rearward of the first member in the direction along the length the mobile body.

With this, the third member is separate from the first member. This reduces weight load on the first member and the second member and thus eliminates or minimizes blur to the image and the reflected image caused by vibration of the mobile body. This further prevents a reduction in usability.

It is still further possible that the optical member is located substantially in a middle of the mobile body as viewed along a width of the mobile body, and the emission portion is located on left or on right of the second housing as viewed along the width of the mobile body.

With this, the first housing including the emission portion and the second housing are separate from each other. This reduces weight load on the first member and the second member and thus eliminates or minimizes blur to the image and the reflected image caused by vibration of the mobile body. This further prevents a reduction in usability.

It is still further possible that the display device includes a drive board, the drive board driving the first display member and being held by the second housing.

Since the drive board is held by the second housing, the size of the first housing is prevented from increasing. This prevents a reduction in usability caused by an increase in the size of the first housing.

It is still further possible that the optical device further includes a light absorbing member that absorbs the light coming from the back of the mobile body and passing through the optical member when the optical member is in the transmitting state.

With this, the light coming from the back of the mobile body and passing through the optical member is prevented from being reflected inside the second housing. This prevents a reduction in visibility caused by unnecessary reflection of light and further prevents a reduction in usability.

It is still further possible that the optical device further includes interior material that is visible through the optical member when the optical member is in the transmitting state.

With this, for example, in a case where the interior material is a fabric with a color similar to that of the roof of the mobile body, the sense of strangeness about the optical device can be reduced because the optical device is located adjacent to the roof and the color similar to the roof is visible when the optical member is in the transmitting state.

It is still further possible that light coming from a front of the mobile body passes through the optical member when the optical member is in the transmitting state.

With this, the person in the mobile body can see what is happening in front of the mobile body through the optical member. This prevents the view of the person looking forward of the mobile body from being blocked and further prevents a reduction in usability.

It is still further possible that the optical device further includes a holding member, the holding member being provided only at a part of an edge portion of the optical member, the holding member holding the optical member, the edge portion being a portion of a side receiving the light coming from the back of the mobile body.

With this, the holding member that holds the optical member is provided only at the part of the edge portion of the optical member. This reduces the size of the holding member and thus improves the forward visibility.

It is still further possible that the optical member includes a first side receiving the light coming from the back of the mobile body and a second side opposite to the first surface, the optical device further includes a second display member facing the second side of the optical member, the second display member being a member that emits second image light forming a second image toward the optical member to allow the second image light to pass through the optical member to exit from the optical member when the optical member is in the transmitting state.

With this, the second image including various content can be viewed through the optical member. This further prevents a reduction in usability.

It is still further possible that the optical member includes a plurality of areas, with each being switchable between the reflecting state and the transmitting state. The display system further comprises: a plurality of third operation receivers; and a plurality of fourth operation receivers. Each of the plurality of third operation receivers corresponds to a corresponding area of the plurality of areas and receives a single third operation for switching the corresponding area to the reflecting state. Each of the plurality of fourth operation receivers corresponds to a corresponding area of the plurality of areas and receives a single fourth operation for switching the corresponding area to the transmitting state. When the display system is in the first mode, the display device is in the emitting state, and all of the plurality of areas are in the transmitting state. When the display system is in the second mode, the display device is in the non-emitting state, and all of the plurality of areas are in the reflecting state. When at least one third operation receiver of the plurality of third operation receivers receives the single third operation while the display system is in the first mode, at least one area corresponding to the at least one third operation receiver among the plurality of areas is switched to the reflecting state so that the display system is switched from the first mode to a third mode where the display device is in the emitting state while at least one of the plurality of areas is in the reflecting state. When at least one fourth operation receiver corresponding to the at least one area among the plurality of fourth operation receivers receives the single fourth operation while the display system is in the third mode, the at least one area is switched to the transmitting state.

With this, each of the plurality of areas is switchable from the transmitting state to the reflecting state in response to a single third operation, and each of the plurality of areas is switchable from the reflecting state to the transmitting state in response to a single fourth operation. This facilitates the switch of the plurality of areas from the transmitting state to the reflecting state and the switch of the plurality of areas from the reflecting state to the transmitting state, thereby further preventing a reduction in usability.

It is still further possible that the optical member includes a plurality of segments. The plurality of segments is equally divided to be arranged in a left-right direction when the optical member is viewed from a side receiving the light coming from the back of the mobile body. Each of the plurality of segments is switchable between the reflecting state and the transmitting state. When the plurality of segments include a reflecting area consisting of two or more consecutive segments each being in the reflecting state, the reflecting area is movable in units of one segment in the left-right direction when the optical member is viewed from the side receiving the light coming from the back of the mobile body. The one segment is in the plurality of segments.

With this, the position of the reflecting area can be adjusted in the left-right direction in units of one segment. Accordingly, even if the angle of the optical member is changed depending on the physique or the like of the driver of the mobile body, it is possible to optimally adjust the range of the back of the mobile body reflected in the reflecting area.

It is still further possible that the number of the two or more consecutive segments that constitute the reflecting area is changeable.

With this, the width of the reflecting area can be adjusted in units of one segment. Accordingly, it is possible to optimally adjust the range of the back of the mobile body reflected in the reflecting area.

It is still further possible that the display system further includes: a controller that causes the display system to be switched to a fourth mode where the display device is in the emitting state while the optical member is in the reflecting state for a predetermined period, when supply of power, to the display system, to operate the display system is turned on from off.

With this, the direction in which the first image light is emitted and the direction in which the light coming from the back of the mobile body is reflected when the supply of power, to the display system, to operate the display system is turned on from off can be easily identified. This further prevents a reduction in usability.

It is still further possible that, in a case where the supply of the power to the display system is turned off from on while the display system is in the first mode, the controller causes the display system to be switched to the fourth mode the next time the power is supplied to the display system, and then switched to the first mode after the fourth mode. In a case where the supply of the power to the display system is turned off from on while the display system is in the second mode, the controller causes the display system to be switched to the fourth mode the next time the power is supplied to the display system, and then switched to the second mode after the fourth mode.

With this, it is possible that, in a case where the supply of power to the display system is turned off from on while the display system is in the first mode, the display system is switched to the fourth mode next time the power is supplied to the display system, and then switched to the first mode after the fourth mode. Moreover, it is possible that, in a case where the supply of power to the display system is turned off from on while the display system is in the second mode, the display system is switched to the fourth mode next time the power is supplied to the display system, and then switched to the second mode after the fourth mode. This further prevents a reduction in usability.

It is still further possible that the operation receiver further receives an operation for switching the display system to a fifth mode where the display device is in the emitting state while the optical member is in the reflecting state.

With this, it is possible to switch the display system to the fifth mode at the request of the person in the mobile body to cause the optical member to be in the reflecting state at all times. Thus, the person can see occupants in the back seats. This further prevents a reduction in usability.

It is still further possible that the display system further includes: an indoor camera provided to at least the first housing, the second housing, a roof of the mobile body, or a rear surface of a backrest of a seat in the mobile body, the indoor camera capturing an image of an interior of the mobile body, wherein the first image includes the image captured by the indoor camera.

With this, the image captured by the indoor camera is also displayed by the display device as a virtual image. Accordingly, the indoor image becomes more easily visible to the driver.

The following embodiments are specific examples of the present disclosure. The numerical values, shapes, materials, elements, arrangement and connection configuration of the elements, steps, the order of the steps, etc., described in the following embodiments are merely examples, and are not intended to limit the present disclosure. Among elements in the following embodiments, those not described in any one of the independent claims indicating the broadest concept of the present disclosure are described as optional elements.

Moreover, optical paths illustrated in the drawings in the following embodiments are given to illustrate the principle concepts and do not necessarily reflect actual optical paths.

Embodiment 1

FIG. 1 is a plan view of display system 10 according to Embodiment 1.

As illustrated in FIG. 1, display system 10 is installed in mobile body 1. Display system 10 displays an image captured by an imager (not illustrated) that captures the image behind mobile body 1, reflect lights coming from the back of mobile body 1, and allows the passage of and absorbs the light coming from the back of mobile body 1. For example, the imager is a camera mounted on mobile body 1.

Mobile body 1 is a vehicle that moves with person 2 in it. In this embodiment, mobile body 1 is a vehicle that person 2 in mobile body 1 can operate to move. In this embodiment, mobile body 1 is a car, and person 2 in mobile body 1 is a driver sitting in driver's seat 3 of mobile body 1. Note that, for example, mobile body 1 may be a boat, plane, or the like.

For example, "along the length" of mobile body 1 means along the front-back directions viewed from person 2 in mobile body 1 (directions along an X-axis in FIG. 1), "along the width" of mobile body 1 means along the left-right directions viewed from person 2 in mobile body 1 (directions along a Y-axis in FIG. 1), and "along the height" of mobile body 1 means along the up-down directions viewed from person 2 in mobile body 1 (directions along a Z-axis in FIG. 1). That is, for example, "forward" of mobile body 1 is a direction in which person 2 in mobile body 1 faces (direction of the positive X-axis in FIG. 1), and "rearward" of mobile body 1 is a direction opposite the direction in which person 2 in mobile body 1 faces (direction of the negative X-axis in FIG. 1). Moreover, for example, "leftward" of mobile body 1 is a left direction relative to the direction in which person 2 in mobile body 1 faces (direction of the positive Y-axis in FIG. 1), and "rightward" of mobile body 1 is a right direction relative to the direction in which person 2 in mobile body 1 faces (direction of the negative Y-axis in FIG. 1). Moreover, for example, "upward" of mobile body 1 is an upward direction relative to the direction in which person 2 in mobile body 1 faces (direction of the positive Z-axis in FIG. 1), and "downward" of mobile body 1 is a downward direction relative to the direction in which person 2 in mobile body 1 faces (direction of the negative Z-axis in FIG. 1).

Display system 10 includes display device 12 and optical device 14.

Display device 12 can display an image. Display device 12 is located forward of person 2 and displays the image toward person 2 (see a dash-dot line arrow in FIG. 1). In this embodiment, display device 12 is disposed inside mobile body 1, located in the middle of mobile body 1 as viewed along the width of mobile body 1, and suspended from windshield 4 of mobile body 1. Note that, for example, display device 12 may be disposed on the dashboard of mobile body 1 or may be suspended from the roof of mobile body 1.

Optical device 14 can reflect light coming from the back of mobile body 1 and allows the light coming from the back of mobile body 1 to pass through optical device 14. In this embodiment, optical device 14 is located forward of person 2 and reflects the light coming from the back of mobile body 1 toward person 2 (see a broken line arrow in FIG. 1). In this embodiment, optical device 14 is disposed inside mobile body 1, located in the middle of mobile body 1 as viewed along the width of mobile body 1, and suspended from windshield 4 of mobile body 1. Note that, for example, optical device 14 may be disposed on the dashboard of mobile body 1 or may be suspended from the roof of mobile body 1.

Display system 10 is switchable, in response to a single operation, between (i) a state where display device 12 displays the image toward person 2 while optical device 14 allows the light coming from the back of mobile body 1 to pass through optical device 14 and (ii) a state where display device 12 does not display the image toward person 2 while optical device 14 reflects the light coming from the back of mobile body 1 toward person 2 (described in detail later).

Display system 10 will now be described in detail.

Figure 2:
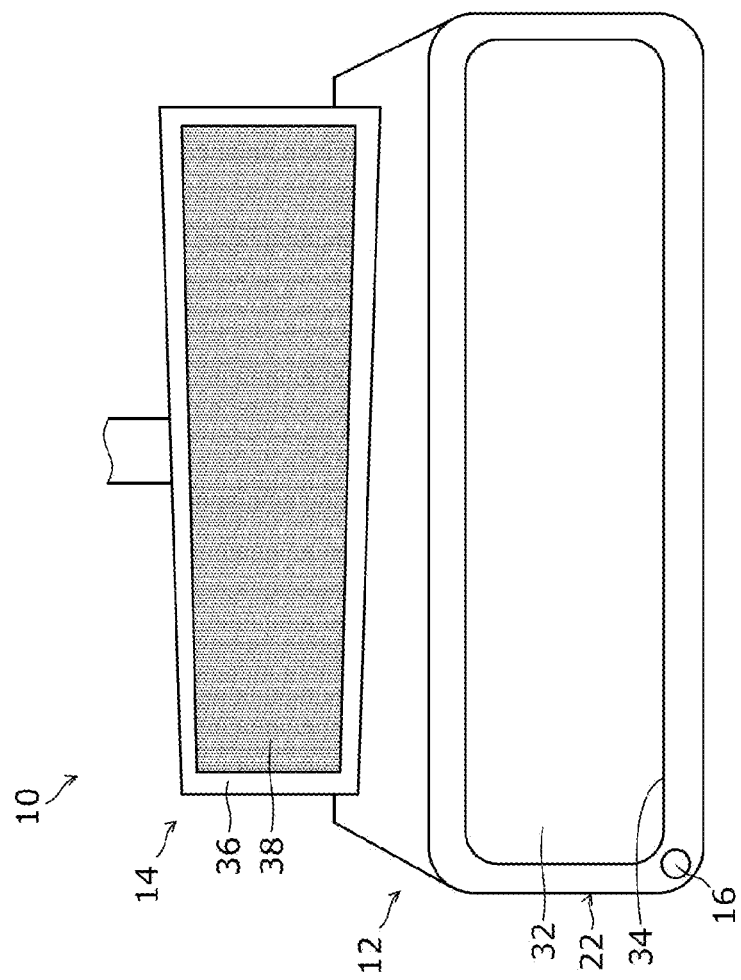
FIG. 2 is a front view of the display system in FIG. 1.
Figure 3:
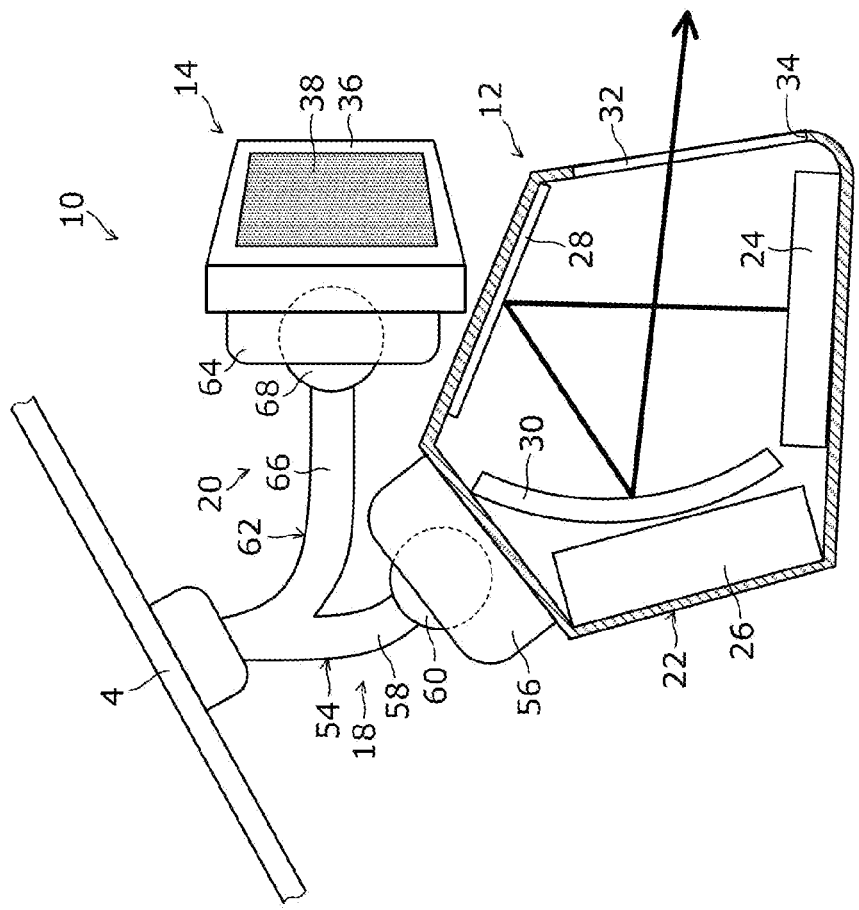
FIG. 3 is a side view of the display system in FIG. 1.
Figure 4:
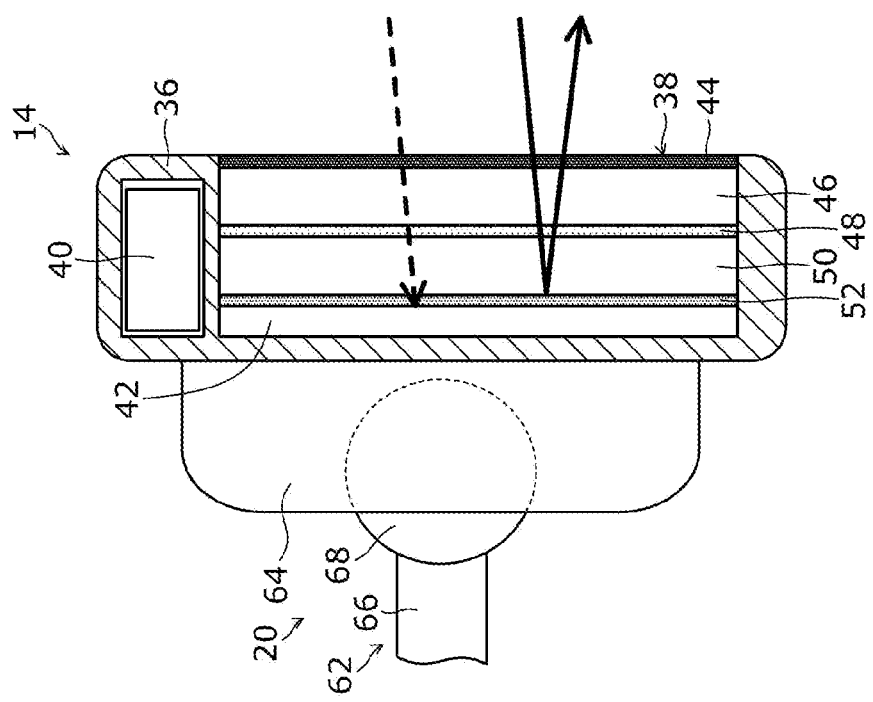
FIG. 4 is a side view of an optical device in the display system in FIG. 1.

FIG. 2 is a front view of display system 10 in FIG. 1. FIG. 3 is a side view of display system 10 in FIG. 1. FIG. 4 is a side view of optical device 14 in display system 10 in FIG. 1. In FIGS. 2 and 3, display system 10 is in a first mode, and optical member 38 is stippled so that it is easily recognized that optical member 38 is in a transmitting state. Moreover, FIG. 3 illustrates first housing 22 in cross section, and FIG. 4 illustrates second housing 36 and optical member 38 in cross section.

As illustrated in FIGS. 2 and 3, display system 10 includes display device 12, optical device 14, push button 16, first support structure 18, and second support structure 20.

Display device 12 includes first housing 22, first display member 24, drive board 26, plane mirror 28, concave mirror 30, and cover 32.

First housing 22 holds first display member 24, drive board 26, plane mirror 28, concave mirror 30, and cover 32, and accommodates first display member 24, drive board 26, plane mirror 28, concave mirror 30, and cover 32. First housing 22 is located forward of person 2 in a direction along the length of mobile body 1, located in the middle of mobile body 1 as viewed along the width of mobile body 1, and located adjacent to the upper end of windshield 4. First housing 22 includes emission portion 34.

First image light is emitted from display device 12 through emission portion 34. The first image light forms a first image. Specifically, the first image light is emitted from first housing 22 through emission portion 34. Emission portion 34 is a through-hole that connects the spaces inside and outside first housing 22. In this embodiment, the first image light is emitted from first housing 22 through emission portion 34 when first display member 24 emits the first image light. In this embodiment, the first image light is not emitted from first housing 22 through emission portion 34 when first display member 24 does not emit the first image light.

In this embodiment, the first image light is emitted from first display member 24, then reflected by concave mirror 30, and emitted from display device 12 through emission portion 34. In this embodiment, the first image light, which has been emitted from first display member 24, reflected by plane mirror 28, and then reflected by concave mirror 30, exits from display device 12 through emission portion 34 (see a thick solid line arrow in FIG. 3).

Emission portion 34 faces person 2 in mobile body 1, and the first image light emitted through emission portion 34 is visible to person 2. Thus, person 2 in mobile body 1 can view the first image.

First display member 24 is a display element emitting the first image light that forms the first image. First display member 24 emits the first image light to display the first image. For example, the first image is an image captured by an imager (not illustrated) that captures the image behind mobile body 1. For example, the imager is a camera mounted on mobile body 1. Note that, for example, the first image may be an image indicating the speed of mobile body 1, results of detection of an object approaching mobile body 1, information about navigation from the current location of mobile body 1 to the destination, or the like. For example, first display member 24 is implemented by including an LCD (Liquid Crystal Display), an organic EL (Electro Luminescence) display, a micro LED (Light Emitting Diode) display, or the like.

Drive board 26 drives first display member 24.

Plane mirror 28 includes a flat reflective surface and reflects the first image light emitted from first display member 24, toward concave mirror 30.

Concave mirror 30 includes a concave reflective surface and reflects the first image light reflected by plane mirror 28 toward cover 32.

Cover 32 is transparent and allows the first image light to pass through cover 32. In this embodiment, cover 32 allows the first image light, which has been emitted from first display member 24, reflected by plane mirror 28, and then reflected by concave mirror 30, to pass through cover 32. In this embodiment, cover 32 is disposed at emission portion 34 to face person 2 in mobile body 1, and the first image light passing through cover 32 exits out of first housing 22 and is visible to person 2.

Display device 12 is switchable between an emitting state where the first image light is allowed to be emitted from display device 12 through emission portion 34 and a non-emitting state where the first image light is not allowed to be emitted from display device through emission portion 34. For example, display device 12 is switched to the emitting state when first display member 24 is powered on and emits the first image light. For example, display device 12 is switched to the non-emitting state when first display member 24 is powered off and does not emit the first image light.

As illustrated in FIGS. 2 to 4, optical device 14 includes second housing 36, optical member 38, drive board 40, and light absorbing member 42.

Second housing 36 holds optical member 38, drive board 40, and light absorbing member 42, and accommodates optical member 38, drive board 40, and light absorbing member 42. Second housing 36 is located forward of person 2 in the direction along the length of mobile body 1, located in the middle of mobile body 1 as viewed along the width of mobile body 1, located adjacent to the upper end of windshield 4, and located above first housing 22. Second housing 36 is a component separate from first housing 22.

Optical member 38 is an optical element that is switchable between a reflecting state where optical member 38 reflects the light coming from the back of mobile body 1 and the transmitting state where the light coming from the back of mobile body 1 passes through optical member 38. In this embodiment, optical member 38 is switched to the transmitting state by receiving voltage and is switched to the reflecting state by not receiving voltage (described in detail later). As a specific example of such a configuration, optical member 38 may be a liquid crystal mirror. The detailed configuration of such optical member 38 will be described later. Note that, for example, optical member 38 may be switched to the transmitting state by not receiving voltage and may be switched to the reflecting state by receiving voltage.

Optical member 38 faces person 2 in mobile body 1, and the light coming from the back of mobile body 1 and reflected by optical member 38 is visible to person 2. This allows person 2 in mobile body 1 to see what is happening in the back of mobile body 1.

Optical member 38 includes transmissive polarizer 44, glass base 46, liquid crystal portion 48, glass base 50, and reflective polarizer 52.

Transmissive polarizer 44 allows only light vibrating in a specific direction to pass through transmissive polarizer 44 while absorbing light other than the light vibrating in the specific direction. Transmissive polarizer 44 is disposed to be exposed to the back of mobile body 1 and allows only light, in the light coming from the back of mobile body 1, vibrating in the specific direction to pass through transmissive polarizer 44 while absorbing the light other than the light vibrating in the specific direction.

Glass base 46 allows the light, in the light coming from the back of mobile body 1, passing through transmissive polarizer 44 to pass through glass base 46.

Liquid crystal portion 48 allows the light, in the light coming from the back of mobile body 1, passing through glass base 46 to pass through liquid crystal portion 48. For example, when voltage is applied to liquid crystal portion 48, liquid crystal portion 48 changes the vibration direction of the light passing through glass base 46 while the light passes through liquid crystal portion 48 so that the light passing through glass base 46 and liquid crystal portion 48 is not reflected by reflective polarizer 52. Moreover, for example, when voltage is not applied to liquid crystal portion 48, liquid crystal portion 48 changes the vibration direction of the light passing through glass base 46 while the light passes through liquid crystal portion 48 so that the light passing through glass base 46 and liquid crystal portion 48 is reflected by reflective polarizer 52. For example, liquid crystal portion 48 may include an ITO (Indium Tin Oxide) electrode, an alignment film, a TN (Twisted Nematic) liquid crystal, another alignment film, and another IOT electrode laminated in this order.

Glass base 50 allows the light, in the light coming from the back of mobile body 1, passing through liquid crystal portion 48 to pass through glass base 50.

Reflective polarizer 52 allows only light vibrating in a specific direction to pass through reflective polarizer 52 while absorbing light other than the light vibrating in the specific direction. Reflective polarizer 52 reflects the light passing through glass base 50 or allows the light to pass through reflective polarizer 52 depending on the vibration direction of the light.

The light reflected by reflective polarizer 52 passes through glass base 50, liquid crystal portion 48, glass base 46, and transmissive polarizer 44 in this order (see a thick solid line arrow in FIG. 4) and is emitted through optical member 38 to the outside of second housing 36.

The light passing through reflective polarizer 52 is absorbed by light absorbing member 42 (see thick broken line arrow in FIG. 4) and is not emitted to the outside of second housing 36.

Thus, in the present embodiment, optical member 38 in the reflecting state reflects the light coming from the back of mobile body 1 using reflective polarizer 52, whereas optical member 38 in the transmitting state does not reflect the light coming from the back of mobile body 1 using reflective polarizer 52.

Drive board 40 drives optical member 38.

Light absorbing member 42 absorbs the light coming from the back of mobile body 1 and passing through optical member 38. In this embodiment, light absorbing member 42 absorbs the light passing through reflective polarizer 52. For example, light absorbing member 42 absorbs light more easily than second housing 36. For example, the color of light absorbing member 42 is black.

Figure 5:
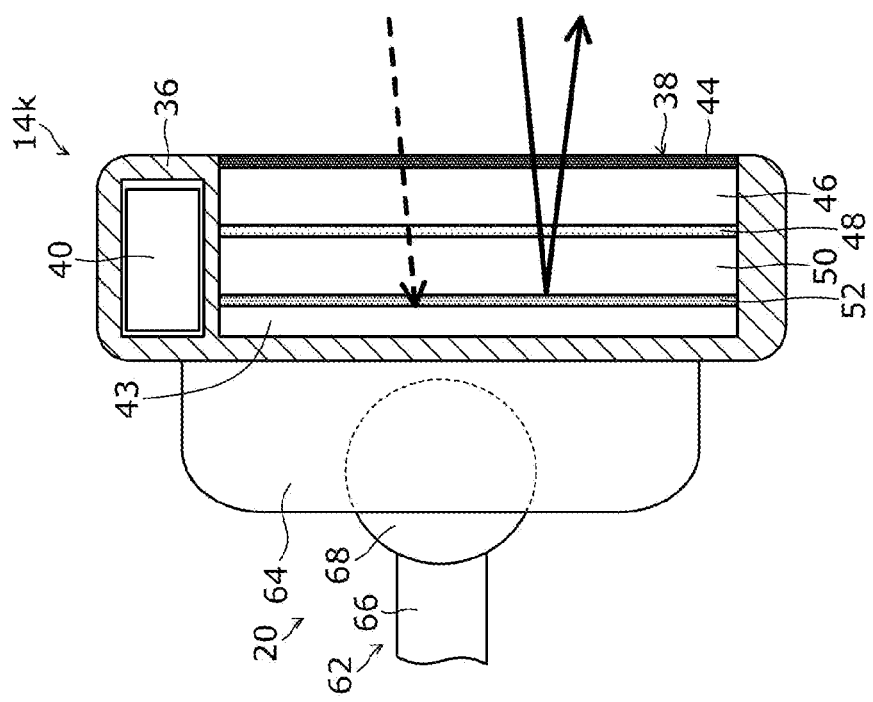
FIG. 5 is a side view illustrating another example of the optical device.

Note that FIG. 4 illustrates a configuration in which light absorbing member 42 is disposed inside second housing 36. However, the configuration is not limited to this, and interior material 43, for example, may be provided instead of light absorbing member 42 as illustrated in FIG. 5. FIG. 5 is a side view illustrating another example of the optical device (optical device 14k). Note that FIG. 5 illustrates second housing 36 and optical member 38 in cross section. As illustrated in FIG. 5, interior material 43 is disposed at a part where light absorbing member 42 is disposed in FIG. 4. As illustrated in FIG. 5, optical device 14k includes interior material 43. Interior material 43 is visible through optical member 38 when optical member 38 is in the transmitting state. Interior material 43 is located on a side of optical member 38 opposite a side receiving the light coming from the back of mobile body 1. Accordingly, when optical member 38 is in the transmitting state, interior material 43 is visible through optical member 38 when optical member 38 is viewed from the side receiving the light coming from the back of mobile body 1. Interior material 43 is similar to material of the interior of mobile body 1. For example, the color of interior material 43 is similar to that of the interior of mobile body 1. Specifically, for example, interior material 43 is a fabric with a color similar to the color of the roof of mobile body 1. With this configuration, interior material 43, which has a color similar to that of the roof, is visible to person 2 when optical member 38 is in the transmitting state. At this moment, even when optical member 38 is in the transmitting state, optical device 14k does not look out of place to person 2 because optical member 38 is disposed adjacent to the roof. In contrast, with the configuration in FIG. 4 including light absorbing member 42, the color of light absorbing member 42 is black, and thus optical member 38 appears to be black to person 2 when optical member 38 is in the transmitting state. The black part adjacent to the roof may feel unnatural to person 2. Accordingly, the configuration in FIG. 5 can reduce the sense of strangeness about optical device 14k.

As illustrated in FIG. 2, push button 16 is an example of an operation receiver that receives operations for switching the display system between (i) the first mode where display device 12 is in the emitting state while optical member 38 is in the transmitting state and (ii) a second mode where display device 12 is in the non-emitting state while optical member 38 is in the reflecting state. In this embodiment, the operation receiver is single push button 16. Moreover, in this embodiment, an operation for switching display system 10 to the first mode is referred to as "first operation", whereas an operation for switching display system 10 to the second mode is referred to as "second operation". That is, the first operation and the second operation are operations of pressing push button 16.

Push button 16 is provided for first housing 22. Note that, for example, push button 16 may be provided for second housing 36 or the steering wheel of mobile body 1. Push button 16 may be disposed at any position that allows person 2 in mobile body 1 to operate. Moreover, the operation receiver may include a first operation receiver that receives the first operation for switching display system 10 to the first mode and a second operation receiver that receives the second operation for switching display system 10 to the second mode separately. Specifically, for example, the operation receiver may include a first push button that receives the first operation for switching display system 10 to the first mode and a second push button that receives the second operation for switching display system 10 to the second mode.

Display system 10 in the first mode switches from the first mode to the second mode when the operation receiver receives the second operation, whereas display system 10 in the second mode switches from the second mode to the first mode when the operation receiver receives the first operation. That is, in this embodiment, display system 10 in the first mode switches from the first mode to the second mode when push button 16 is pressed one time, whereas display system 10 in the second mode switches from the second mode to the first mode when push button 16 is pressed one time. Thus, in this embodiment, display system 10 in the first mode switches from the first mode to the second mode when the operation receiver receives a single second operation, whereas display system in the second mode switches from the second mode to the first mode when the operation receiver receives a single first operation.

In this embodiment, display system 10 includes controller 70 (described in detail later). For example, controller 70 determines whether push button 16 is pressed using a switch (not illustrated) that detects whether push button 16 is pressed. For example, when push button 16 is pressed while display system 10 is in the first mode, controller 70 switches display system 10 from the first mode to the second mode by turning first display member 24 off from on and switching the application of voltage to optical member 38 off from on. Moreover, for example, when push button 16 is pressed while display system 10 is in the second mode, controller 70 switches display system 10 from the second mode to the first mode by turning first display member 24 on from off and switching the application of voltage to optical member 38 on from off.

Thus, in this embodiment, display system 10 in the first mode switches from the first mode to the second mode when the operation receiver receives the second operation, whereas display system 10 in the second mode switches from the second mode to the first mode when the operation receiver receives the first operation.

As illustrated in FIG. 3, first support structure 18 supports display device 12 such that display device 12 can pivot. First support structure 18 includes first member 54 and second member 56.

First member 54 is secured to mobile body 1. First member 54 includes stud portion 58 and ball portion 60. Stud portion 58 is elongated from windshield 4 of mobile body 1 downward of mobile body 1. Ball portion 60 is disposed at an end of stud portion 58.

Second member 56 engages with first member 54 to be pivotable on first member 54 and is secured to first housing 22. Second member 56 is secured to an upper part of first housing 22 on a side opposite a side from which the first image light is emitted. In this embodiment, second member 56 is a socket portion that engages with ball portion 60 to be pivotable on ball portion 60.

Second support structure 20 supports optical device 14 such that optical device 14 can pivot. Second support structure 20 includes third member 62 and fourth member 64.

Third member 62 is secured to mobile body 1. Third member 62 includes stud portion 66 and ball portion 68. Stud portion 66 is elongated from windshield 4 of mobile body 1 rearward of mobile body 1. Stud portion 66 is integral to stud portion 58, and first member 54 and third member 62 are integrally formed. Ball portion 68 is disposed at an end of stud portion 66.

Fourth member 64 engages with third member 62 to be pivotable on third member 62 and is secured to second housing 36. Fourth member 64 is secured to a side of second housing 36 opposite a side from which light is reflected by optical member 38. In this embodiment, fourth member 64 is a socket portion that engages with ball portion 68 to be pivotable on ball portion 68.

Figure 6:
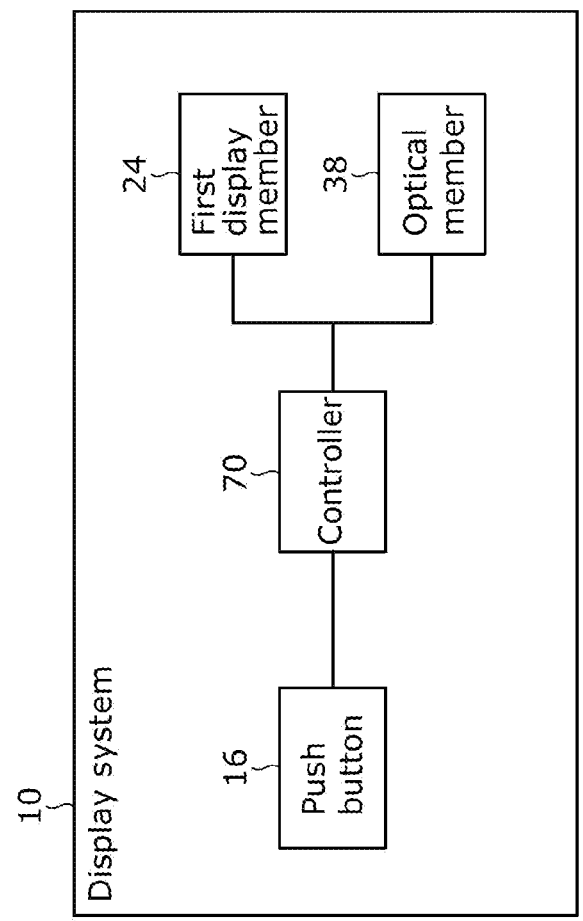
FIG. 6 is a block diagram illustrating a functional configuration of the display system in FIG. 1.

FIG. 6 is a block diagram illustrating a functional configuration of display system 10 in FIG. 1.

As illustrated in FIG. 6, display system 10 further includes controller 70.

Controller 70 controls first display member 24, optical member 38, and the like. For example, controller 70 controls first display member 24 and optical member 38 such that display system switches to the second mode when push button 16 is pressed while display system 10 is in the first mode, and controls first display member 24 and optical member 38 such that display system 10 switched to the first mode when push button 16 is pressed while display system 10 is in the second mode.

For example, controller 70 includes drive board 26, drive board 40, and the like to control first display member 24, optical member 38, and the like.

Moreover, for example, when supply of power, to display system 10, to operate display system 10 is turned on from off, controller 70 causes display system 10 to be switched to a fourth mode where display device 12 is in the emitting state while optical member 38 is in the reflecting state for a predetermined period. That is, when the supply of power, to display system 10, to operate display system 10 is turned on from off, display device 12 is switched to be in the emitting state for the predetermined period and optical member 38 is switched to be in the reflecting state for the predetermined period.

Moreover, for example, in a case where the supply of power, to display system 10, to operate display system 10 is turned off from on while display system 10 is in the first mode, controller 70 causes display system 10 to be switched to the fourth mode next time the power is supplied to display system 10, and then switched to the first mode after the fourth mode. That is, for example, in a case where the supply of power to display system 10 is turned off from on while display system 10 is in the first mode, display system 10 is switched to the fourth mode next time the power is supplied to display system 10, and then switched to the first mode after the fourth mode.

Moreover, for example, in a case where the supply of power, to display system 10, to operate display system 10 is turned off from on while display system 10 is in the second mode, controller 70 causes display system 10 to be switched to the fourth mode next time the power is supplied to display system 10, and then switched to the second mode after the fourth mode. That is, for example, in a case where the supply of power to display system 10 is turned off from on while display system 10 is in the second mode, display system 10 is switched to the fourth mode next time the power is supplied to display system 10, and then switched to the second mode after the fourth mode.

In this manner, for example, when the supply of power, to display system 10, to operate display system 10 is turned on from off, controller 70 causes display system 10 to be switched to the fourth mode and then switched to the mode at the time the power to operate display system 10 was supplied to display system 10 last.

Display system 10 according to Embodiment 1 has been described above.

As described above, display system 10 according to Embodiment 1 is installed in mobile body 1 and includes display device 12 that includes emission portion 34 through which the first image light forming the first image is emitted from display device 12 and that is switchable between (i) the emitting state where display device 12 allows the first image light to be emitted through emission portion 34 and (ii) the non-emitting state where display device 12 does not allow the first image light to be emitted through emission portion 34, optical device 14 including optical member 38 that is switchable between (i) the reflecting state where optical member 38 reflects the light coming from the back of mobile body 1 and (ii) the transmitting state where the light coming from the back of mobile body 1 is emitted from optical device 14 through optical member 38, and the operation receiver (push button 16) that receives the operations for switching display system 10 between (i) the first mode where display device 12 is in the emitting state while optical member 38 is in the transmitting state and (ii) the second mode where display device 12 is in the non-emitting state while optical member 38 is in the reflecting state.

With this, display system 10 can be easily switched from the first mode to the second mode and from the second mode to the first mode in response to the operations on the operation receiver (push button 16). This prevents a reduction in usability.

Moreover, in display system 10 according to Embodiment 1, the operation receiver may include the first operation receiver that receives the first operation for switching display system 10 to the first mode and the second operation receiver that receives the second operation for switching display system 10 to the second mode.

With this, the switch from the first mode to the second mode can be performed by the second operation receiver, and the switch from the second mode to the first mode can be performed by the first operation receiver. Thus, the switch from the first mode to the second mode and the switch from the second mode to the first mode can be performed by the dedicated operation receivers. This further prevents a reduction in usability.

Moreover, in display system 10 according to Embodiment 1, the operation receiver is single push button 16.

With this, display system 10 can be switched from the first mode to the second mode and from the second mode to the first mode with a press on single push button 16. This further facilitates the switch from the first mode to the second mode and the switch from the second mode to the first mode, thereby further preventing a reduction in usability.

Moreover, in display system 10 according to Embodiment 1, display device 12 includes first display member 24 that emits the first image light, concave mirror 30 that reflects the first image light emitted from first display member 24, and first housing 22 that includes emission portion 34 and that holds first display member 24 and concave mirror 30; optical device 14 includes second housing 36, which is a component separate from first housing 22, that holds optical member 38; and emission portion 34 through which the first image light, which has been emitted from first display member 24 and then reflected by concave mirror 30, is emitted from display device 12.

With this, the first image can be displayed to be located farther from person 2 in mobile body 1. This reduces focus shift that occurs when person 2 looking forward of mobile body 1 looks at the first image, thereby further preventing a reduction in usability.

Moreover, display system 10 according to Embodiment 1 includes first support structure 18 including first member 54 and second member 56 that engages with first member 54 to be pivotable on first member 54 and that is secured to first housing 22 and second support structure 20 including third member 62 and fourth member 64 that engages with third member 62 to be pivotable on third member 62 and that is secured to second housing 36.

With this, first housing 22 can be pivoted such that emission portion 34 is disposed at a position where the first image light emitted through emission portion 34 is easily visible. Moreover, second housing 36 can be pivoted such that optical member 38 is disposed at a position where the light coming from the back of mobile body 1 and reflected by optical member 38 is easily visible. This further prevents a reduction in usability.

Moreover, in display system 10 according to Embodiment 1, first member 54 and third member 62 are integrally formed.

With this, first member 54 and third member 62 do not need to be secured to mobile body 1 separately. This saves time and effort to secure first member 54 and third member 62 to mobile body 1 and further prevents a reduction in usability.

Moreover, in display system 10 according to Embodiment 1, optical device 14 includes light absorbing member 42 that absorbs the light coming from the back of mobile body 1 and passing through optical member 38 when optical member 38 is in the transmitting state.

With this, the light coming from the back of mobile body 1 and passing through optical member 38 is prevented from being reflected inside second housing 36. This prevents a reduction in visibility caused by unnecessary reflection of light and further prevents a reduction in usability.

Moreover, optical device 14$k$ includes interior material 43 that is visible through optical member 38 when optical member 38 is in the transmitting state.

With this, for example, in a case where interior material 43 is a fabric with a color similar to that of the roof of mobile body 1, the sense of strangeness about optical device 14$k$ can be reduced because optical device 14$k$ is located adjacent to the roof and the color similar to the roof is visible when optical member 38 is in the transmitting state.

Moreover, display system 10 according to Embodiment 1 includes controller 70 that causes display system 10 to be switched to the fourth mode where display device 12 is in the emitting state while optical member 38 is in the reflecting state for the predetermined period, when the supply of power, to display system 10, to operate display system 10 is turned on from off.

With this, the direction in which the first image light is emitted and the direction in which the light coming from the back of mobile body 1 is reflected when the supply of power, to display system 10, to operate display system 10 is turned on from off can be easily identified. This further prevents a reduction in usability.

Moreover, in a case where the supply of power, to display system 10, to operate display system 10 is turned off from on while display system 10 is in the first mode, controller 70 causes display system 10 to be switched to the fourth mode next time the power is supplied to display system 10, and then to switched to the first mode after the fourth mode, whereas in a case where the supply of power to display system 10 is turned off from on while display system 10 is in the second mode, controller 70 causes display system 10 to be switched to the fourth mode next time the power is supplied to display system 10, and then switched to the second mode after the fourth mode.

With this, it is possible that, in a case where the supply of power to display system 10 is turned off from on while display system 10 is in the first mode, display system 10 is switched to the fourth mode next time the power is supplied to display system 10, and then switched to the first mode after the fourth mode. Moreover, it is possible that, in a case where the supply of power to display system 10 is turned off from on while display system 10 is in the second mode, display system 10 is switched to the fourth mode next time the power is supplied to display system 10, and then switched to the second mode after the fourth mode. This further prevents a reduction in usability.

Embodiment 2

FIG. 7 is a side view of optical device 14$a$ according to Embodiment 2. Note that FIG. 7 illustrates second housing 36$a$ and optical member 38 in cross section.

As illustrated in FIG. 7, the display system according to Embodiment 2 mainly differs from display system 10 in including optical device 14$a$ instead of optical device 14 and in including second support structure 20$a$ instead of second support structure 20.

Optical device 14a mainly differs from optical device 14 in not including light absorbing member 42 and in including second housing 36a instead of second housing 36.

Second housing 36a holds optical member 38 such that optical member 38 is also exposed to the front of mobile body 1.

When in the transmitting state, light coming from the front of mobile body 1 passes through optical member 38 in addition to the light coming from the back of mobile body 1 (see a thick broken line arrow in FIG. 7). In this embodiment, optical member 38 faces windshield 4 in the direction along the length of mobile body 1, and the light coming from the front of mobile body 1 and passing through windshield 4 passes through optical member 38. The light coming from the front of mobile body 1 and passing through optical member 38 is emitted to the outside of second housing 36a and can be viewed by person 2 in mobile body 1.

When in the reflecting state, optical member 38 reflects the light coming from the front of mobile body 1 in addition to the light coming from the back of mobile body 1 (see thick solid line arrows in FIG. 7).

Second support structure 20a includes third member 62a and fourth member 64a. Fourth member 64a is secured to an upper part of second housing 36a.

The display system according to Embodiment 2 has been described above.

In the display system according to Embodiment 2, the light coming from the front of mobile body 1 passes through optical member 38 when optical member 38 is in the transmitting state.

With this, person 2 can see what is happening in front of mobile body 1 through optical member 38. This prevents the view of person 2 looking forward of mobile body 1 from being blocked and further prevents a reduction in usability.

Embodiment 3

Figure 8A:
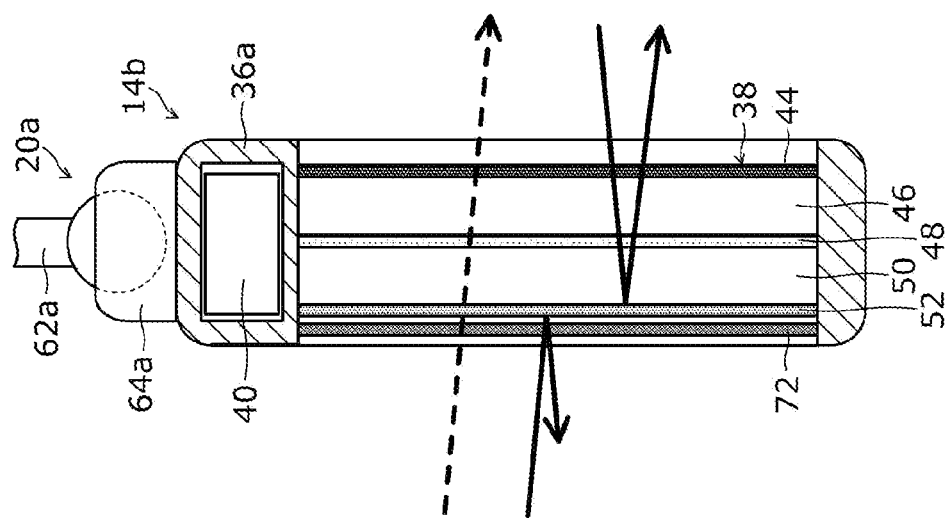
FIG. 8A is a side view of an optical device according to Embodiment 3.
Figure 8C:
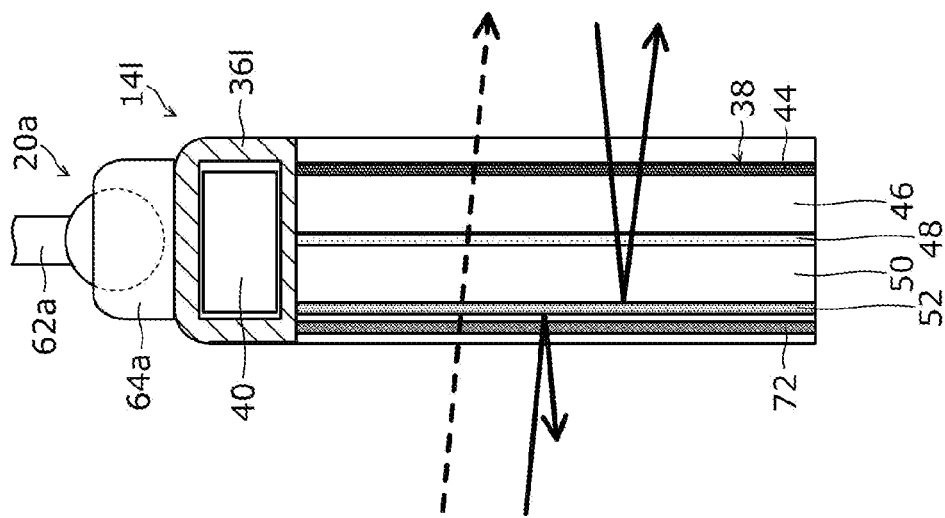
FIG. 8C is a side view illustrating another example of the optical device.
Figure 8E:
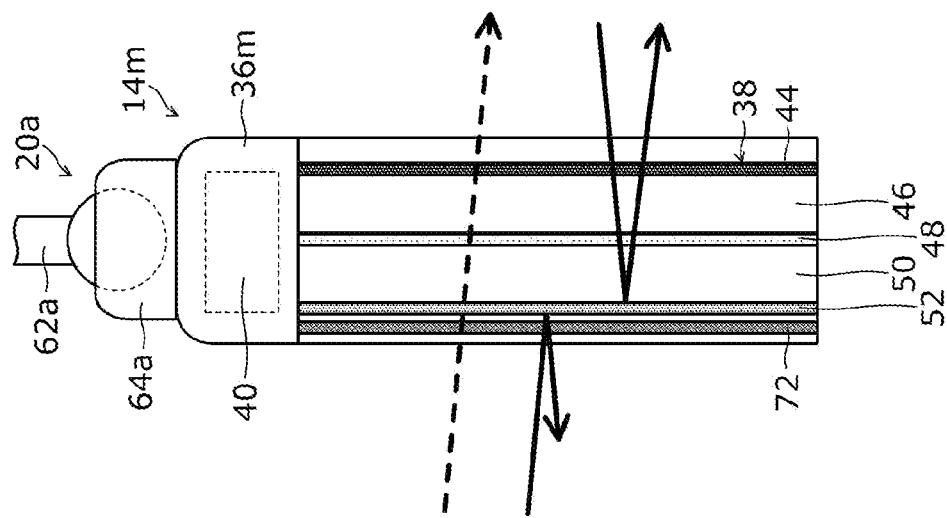
FIG. 8E is a side view illustrating yet another example of the optical device.

FIG. 8A is a side view of optical device 14b according to Embodiment 3. FIG. 8B is a front view of optical device 14b in FIG. 8A. FIG. 8C is a side view illustrating another example of the optical device (optical device 14l). FIG. 8D is a front view of optical device 14l in FIG. 8C. FIG. 8E is a side view illustrating yet another example of the optical device (optical device 14m). FIG. 8F is a front view of optical device 14m in FIG. 8E. Note that FIG. 8A illustrates second housing 36a and optical member 38 in cross section, that FIG. 8C illustrates second housing 36l and optical member 38 in cross section, and that FIG. 8E illustrates optical member 38 in cross section.

As illustrated in FIG. 8A, the display system according to Embodiment 3 mainly differs from the display system according to Embodiment 2 in including optical device 14b instead of optical device 14a.

Optical device 14b mainly differs from optical device 14a in further including transmissive polarizer 72.

Transmissive polarizer 72 allows only light vibrating in a specific direction to pass through transmissive polarizer 72 while absorbing light other than the light vibrating in the specific direction. Transmissive polarizer 72 is disposed on the side of optical member 38 opposite the side receiving the light coming from the back of mobile body 1, disposed to be exposed to the front of mobile body 1, and allows only light, in the light coming from the front of mobile body 1, vibrating in the specific direction to pass through transmissive polarizer 72 while absorbing light other than the light vibrating in the specific direction. This prevents the light coming from the front of mobile body 1 from striking optical member 38 and being reflected forward of mobile body 1.

Here, FIG. 8B illustrates optical device 14b in FIG. 8A viewed from the front. As illustrated in FIG. 8B, a frame (second housing 36a) is provided around optical member 38. Drive board 40 (circuits, wires, and the like used to drive liquid crystal portion 48) is embedded in second housing 36a because optical member 38 includes liquid crystal portion 48 as described above. However, in optical device 14b in FIGS. 8A and 8B, when liquid crystal portion 48 is turned on and optical member 38 is in the transmitting state, light coming from the outside of mobile body 1 passes through optical member 38 while the light coming from the outside does not pass through second housing 36a. Thus, the configuration illustrated in FIGS. 8A and 8B causes only second housing 36a to stand out when optical member 38 is in the transmitting state.

To prevent this, the frame may not be provided on the lower side and the left and right sides of optical member 38 as illustrated in FIGS. 8C and 8D. As illustrated in FIGS. 8C and 8D, optical device 14l mainly differs from optical device 14b in including second housing 36l instead of second housing 36a. Second housing 36l is an example of a holding member. Second housing 36l is provided only at a part of the edge portion of optical member 38, when optical member 38 is viewed from the side receiving the light coming from the back of mobile body 1. Second housing 36l holds optical member 38. Here, second housing 36l is provided only at the upper edge portion of optical member 38 when optical member 38 is viewed from the side receiving which the light coming from the back of mobile body 1. Second housing 36l is elongated along the upper edge portion of optical member 38 when optical member 38 is viewed from the side receiving the light coming from the back of mobile body 1. For example, second housing 36l pinches the upper edge portion of optical member 38 to hold optical member 38. Moreover, for example, second housing 36l is bonded to the upper edge portion of optical member 38 with adhesive or the like to hold optical member 38. In the case of this configuration, the wires connected to liquid crystal portion 48 and drive board 40 are embedded in the frame (second housing 36l) on the upper side. This eliminates the need for a space required for the circuits and the like used to drive liquid crystal portion 48 on the lower side and the left and right sides of optical member 38, and thus second housing 36l does not need to be provided at the lower edge portion, the left edge portion, and the right edge portion of optical member 38. As a result, second housing 36l does not easily stand out, and thus the forward visibility is improved.

Furthermore, a frame (second housing 36m) may be provided only at a part of the upper side of optical member 38 as illustrated in FIGS. 8E and 8F. As illustrated in FIGS. 8E and 8F, optical device 14m mainly differs from optical device 14b in including second housing 36m instead of second housing 36a. Second housing 36m is an example of the holding member that is provided only at a part of the edge portion of optical member 38, when optical member 38 is viewed from the side receiving the light coming from the back of mobile body 1, and that holds optical member 38. Here, second housing 36m is provided only at a part of the upper edge portion of optical member 38 when optical member 38 is viewed from the side receiving the light coming from the back of mobile body 1. Second housing 36m is disposed in the middle of the upper edge portion of optical member 38 when optical member 38 is viewed from the side receiving the light coming from the back of mobile body 1. For example, second housing 36m pinches the upper edge portion of optical member 38 to hold optical member 38. Moreover, for example, second housing 36m is bonded to the upper edge portion of optical member 38 with adhesive or the like to hold optical member 38. In the case of this configuration, the wires connected to liquid crystal portion 48 and drive board 40 are embedded in second housing 36m located on the upper side. This eliminates the need for second housing 36l provided at a part of the upper side in addition to the lower side and the left and right sides of optical member 38. With this structure, compared with the configuration in FIGS. 8C and 8D, second housing 36m does not easily stand out when optical member 38 is in the transmitting state, and thus the forward visibility is further improved.

In the configuration in FIGS. 8E and 8F, fourth member 64a and optical member 38 may be mechanically connected to each other using a thin cylindrical shaft instead of second housing 36m so that flexible wires from liquid crystal portion 48 are disposed inside the shaft, and drive board 40 may be embedded inside fourth member 64a. In this case, the shaft is an example of the holding member. In this case, compared with the configuration in FIGS. 8E and 8F, the holding member is provided at substantially no place on the upper side of optical member 38. This further improves the forward visibility.

The display system according to Embodiment 3 has been described above.

In the display system according to Embodiment 3, optical devices 14l and 14m include the holding member (second housings 36l and 36m) that is provided only at a part of the edge portion of optical member 38, when optical member 38 is viewed from the side receiving the light coming from the back of mobile body 1, and that holds optical member 38.

With this, the holding member (second housings 36l and 36m) that holds optical member 38 is provided only at the part of the edge portion of optical member 38. This reduces the size of the holding member (second housings 36l and 36m) and thus improves the forward visibility.

Embodiment 4

FIG. 9 is a front view of display system 10c according to Embodiment 4. Note that, in FIG. 9, display system 10c is in the second mode, and cover 32 is stippled so that it is easily recognized that display device 12c is in the non-emitting state.

As illustrated in FIG. 9, display system 10c according to Embodiment 4 mainly differs from display system 10 in including display device 12c instead of display device 12, in including optical device 14c instead of optical device 14, and in including a plurality of push buttons 74, 76, and 78.

Display device 12c mainly differs from display device 12 in including first housing 22c instead of first housing 22. First housing 22c is provided with the plurality of push buttons 74, 76, and 78.

Optical device 14c mainly differs from optical device 14 in including optical member 38c instead of optical member 38.

Optical member 38c mainly differs from optical member 38 in including a plurality of areas 80, 82, and 84 and in being switchable between the reflecting state and the transmitting state in each of the plurality of areas 80, 82, and 84. For example, optical member 38c includes a plurality of liquid crystal portions (not illustrated) that are separate from each other and that respectively correspond to the plurality of areas 80, 82, and 84, and is thereby switchable between the reflecting state and the transmitting state in each of the plurality of areas 80, 82, and 84. Each of the plurality of liquid crystal portions has a configuration similar to that of liquid crystal portion 48.

The plurality of push buttons 74, 76, and 78 are an example of a plurality of third operation receivers that respectively correspond to the plurality of areas 80, 82, and 84 and that each receive a single third operation with which the corresponding area in the plurality of areas 80, 82, and 84 is switched to the reflecting state. Moreover, the plurality of push buttons 74, 76, and 78 are an example of a plurality of fourth operation receivers that respectively correspond to the plurality of areas 80, 82, and 84 and that each receive a single fourth operation with which the corresponding area in the plurality of areas 80, 82, and 84 is switched to the transmitting state. That is, in this embodiment, the third operation receiver and the fourth operation receiver associated with area 80 are integrally formed and are single push button 74. Moreover, the third operation receiver and the fourth operation receiver associated with area 82 are integrally formed and are single push button 76. The third operation receiver and the fourth operation receiver associated with area 84 are integrally formed and are single push button 78. Moreover, the third operation and the fourth operation associated with area 80 are operations of pressing push button 74. Moreover, the third operation and the fourth operation associated with area 82 are operations of pressing push button 76. Moreover, the third operation and the fourth operation associated with area 84 are operations of pressing push button 78.

The plurality of push buttons 74, 76, and 78 are provided for first housing 22c. Note that, for example, the plurality of push buttons 74, 76, and 78 may be provided for second housing 36 or the steering wheel of mobile body 1. The plurality of push buttons 74, 76, and 78 may be disposed at any position that allows person 2 in mobile body 1 to operate.

In this embodiment, when display system 10c is in the first mode, display device 12c is in the emitting state, and all of the plurality of areas 80, 82, and 84 are in the transmitting state. When display system 10c is in the second mode, display device 12c is in the non-emitting state, and all of the plurality of areas 80, 82, and 84 are in the reflecting state.

Moreover, in this embodiment, when one of the plurality of third operation receivers receives the third operation while display system 10c is in the first mode, one area corresponding to the one third operation receiver in the plurality of areas 80, 82, and 84 switches to the reflecting state, and thereby display system 10c switches to a third mode where display device 12c is in the emitting state while at least one of the plurality of areas 80, 82, and 84 is in the reflecting state. Moreover, in this embodiment, when one of the plurality of fourth operation receivers corresponding to the one area receives the fourth operation while display system 10c is in the third mode, the one area switches to the transmitting state.

For example, when push button 74 in the plurality of push buttons 74, 76, and 78 is pressed while display system 10c is in the first mode, area 80 corresponding to push button 74 in the plurality of areas 80, 82, and 84 switches to the reflecting state, and thereby display system 10c switches to the third mode. Moreover, for example, when push button 74 corresponding to area 80 in the plurality of push buttons 74, 76, and 78 is pressed while display system 10c is in the third mode, area 80 switches to the transmitting state.

For example, controller 70 (see FIG. 6) determines whether push buttons 74, 76, and 78 are pressed using switches (not illustrated) that detect whether push buttons 74, 76, and 78 are pressed. For example, when push button 76 is pressed while area 82 is in the transmitting state, controller 70 switches the application of voltage to the liquid crystal portion associated with area 82 corresponding to push button 76 off from on to switch area 82 to the reflecting state. Moreover, for example, when push button 76 is pressed while area 82 is in the reflecting state, controller 70 switches the application of voltage to the liquid crystal portion associated with area 82 corresponding to push button 76 on from off to switch area 82 to the transmitting state.

Thus, in this embodiment, optical member 38c is switchable between the reflecting state and the transmitting state in each of the plurality of areas 80, 82, and 84.

Moreover, for example, in a case where the supply of power, to display system 10c, to operate display system 10c is turned off from on while display system 10c is in the third mode, controller 70 may cause display system 10c to be switched to the fourth mode next time the power is supplied to display system 10c, and then to switched to the third mode after the fourth mode.

Figure 10:
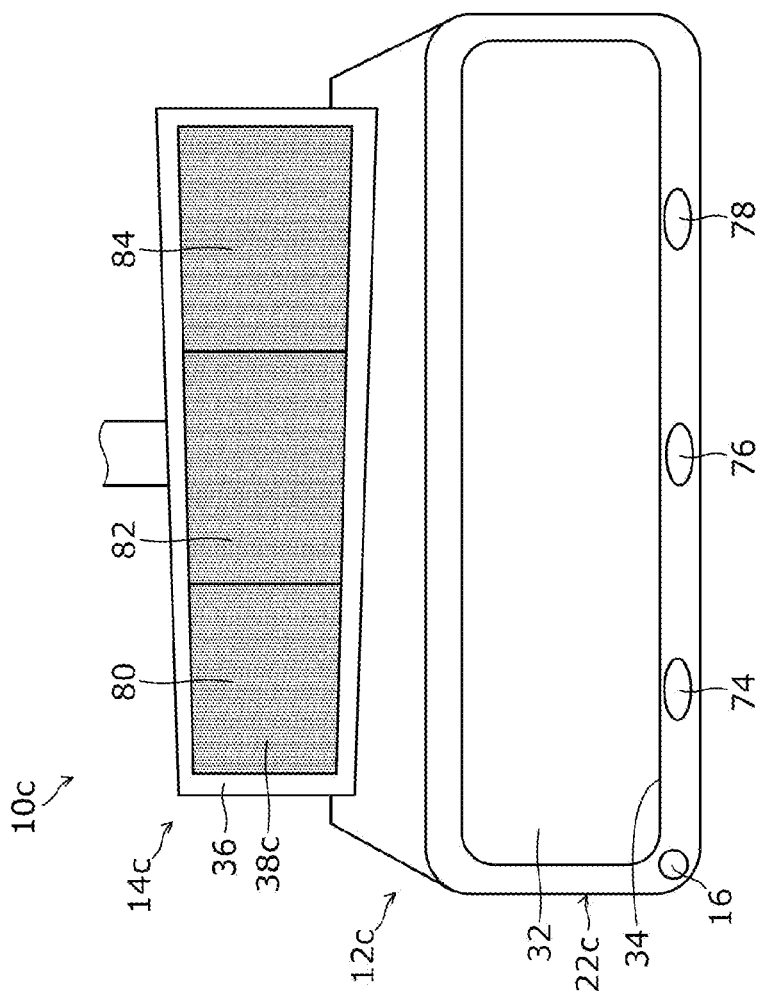
FIG. 10 is a front view of the display system in FIG. 9 in another state.

FIG. 10 is a front view of display system 10c in FIG. 9 in another state. FIG. 11 is a front view of display system 10c in FIG. 9 in yet another state. In FIG. 10, display system 10c is in the first mode, and the plurality of areas 80, 82, and 84 are stippled so that it is easily recognized that the plurality of areas 80, 82, and 84 are in the transmitting state. Moreover, in FIG. 11, display system 10c is in the third mode, and area 80 and area 82 are stippled so that it is easily recognized that area 80 and area 82 are in the transmitting state.

For example, when push button 16 is pressed while display system 10c is in the state illustrated in FIG. 9, display system 10c switches to the first mode as illustrated in FIG. 10.

When push button 78 is pressed while display system 10c is in the state illustrated in FIG. 10, area 84 switches to the reflecting state, and thereby display system 10c switches to the third mode as illustrated in FIG. 11. Switching the mode in this manner allows person 2 to see, for example, a child sitting in the back seat on the right using area 84.

Display system 10c according to Embodiment 4 has been described above.

In display system 10c according to Embodiment 4, optical member 38c includes the plurality of areas 80, 82, and 84 and is switchable between the reflecting state and the transmitting state in each of the plurality of areas 80, 82, and 84. Display system 10c includes the plurality of third operation receivers (the plurality of push buttons 74, 76, and 78) that respectively correspond to the plurality of areas 80, 82, and 84 and that each receive a single third operation with which the corresponding area in the plurality of areas 80, 82, and 84 is switched to the reflecting state; and the plurality of fourth operation receivers (push buttons 74, 76, and 78) that respectively correspond to the plurality of areas 80, 82, and 84 and that each receive a single fourth operation with which the corresponding area in the plurality of areas 80, 82, and 84 is switched to the transmitting state. When display system 10c is in the first mode, display device 12c is in the emitting state, and all of the plurality of areas 80, 82, and 84 are in the transmitting state. When display system 10c is in the second mode, display device 12c is in the non-emitting state, and all of the plurality of areas 80, 82, and 84 are in the reflecting state. When one third operation receiver of the plurality of third operation receivers receives the third operation while display system 10c is in the first mode, one area corresponding to the one third operation receiver in the plurality of areas 80, 82, and 84 switches to the reflecting state, and thereby display system 10c switches to the third mode where display device 12c is in the emitting state while at least one of the plurality of areas 80, 82, and 84 is in the reflecting state. When one fourth operation receiver of the plurality of fourth operation receivers corresponding to the one area receives the fourth operation while display system 10c is in the third mode, the one area switches to the transmitting state.

With this, each of the plurality of areas 80, 82, and 84 is switchable from the transmitting state to the reflecting state in response to a single third operation, and each of the plurality of areas 80, 82, and 84 is switchable from the reflecting state to the transmitting state in response to a single fourth operation. This facilitates the switch of the plurality of areas 80, 82, and 84 from the transmitting state to the reflecting state and the switch of the plurality of areas 80, 82, and 84 from the reflecting state to the transmitting state, thereby further preventing a reduction in usability.

Variation

Figure 12A:
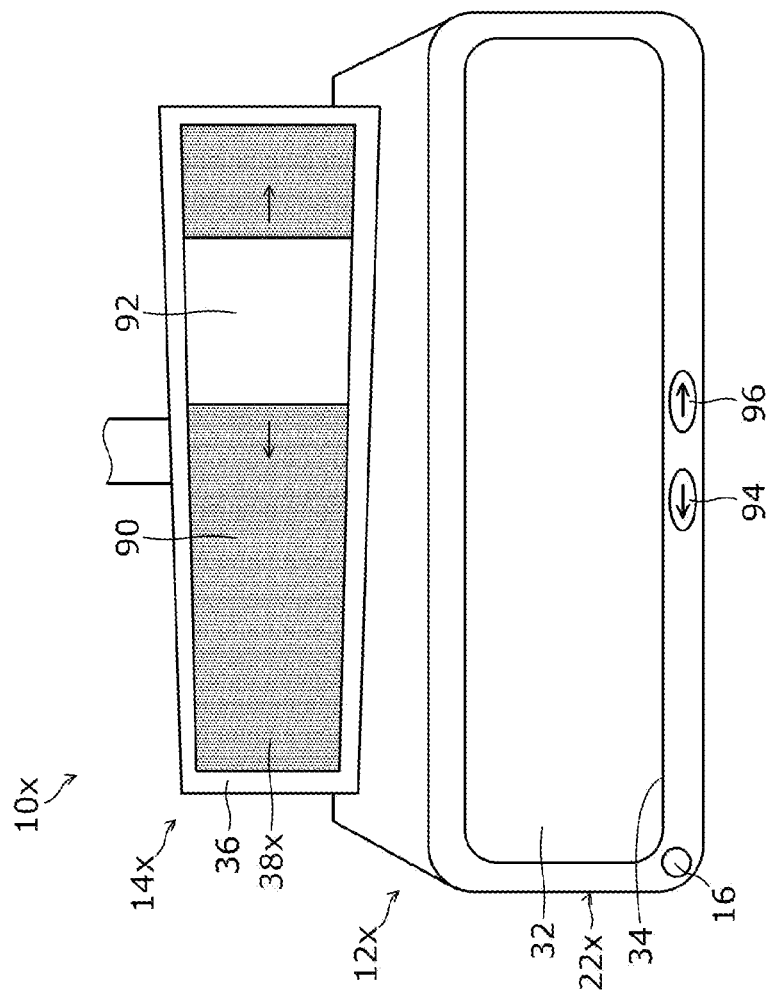
FIG. 12A is a front view of a display system according to Variation of Embodiment 4.

FIG. 12A is a front view of display system 10x according to Variation of Embodiment 4. Note that, in FIG. 12A, elements identical to those in FIG. 2 will be referenced by the same designators, and the detailed explanations will be omitted. The distinctive configuration in this variation is that the position and width of reflecting area 92 in the reflecting state can be adjusted freely. The feature will now be described in detail.

As indicated by arrows in FIG. 12A, optical member 38x of optical device 14x has a configuration that allows reflecting area 92 in the reflecting state to be moved from side to side to any desired position. Note that parts in the transmitting state in optical member 38x, which are parts except for reflecting area 92, are referred to as "transmitting areas 90". Reflecting area 92 can be moved from side to side toward transmitting areas 90.

A specific configuration of optical member 38x with the above-described configuration will now be described with reference to FIG. 12B. FIG. 12B is a front view of optical member 38x in display system 10x in FIG. 12A. In the configuration in FIG. 11, optical member 38c includes the three separate areas 80, 82, and 84. In this variation, optical member 38x includes a plurality of segments 88 divided into twenty equal parts arranged in the left-right direction (lateral direction) as illustrated in FIG. 12B. Note that the number of the divided segments here is an example and may be more or less than twenty. Each of the plurality of segments 88 is switchable between the reflecting state and the transmitting state. Any given number (five in the example in FIG. 12B) of consecutive segments 88 in the reflecting state constitute reflecting area 92. Moreover, remaining segments 88 in the transmitting state constitute transmitting areas 90. Reflecting area 92 can be moved from side to side toward transmitting areas 90 by one segment 88 at a time. That is, for example, when reflecting area 92 is moved to the left by one segment 88, one segment 88 that is included in transmitting areas 90 and immediately adjacent to the left end of current reflecting area 92 is switched to the reflecting state, thereby being added to reflecting area 92, whereas segment 88 at the right end of current reflecting area 92 is switched to the transmitting state, thereby being added to transmitting areas 90. In this manner, reflecting area 92 moves to the left by one segment 88.

Note that the number of adjacent segments 88 in reflecting area 92 in the reflecting state is not limited to five and may be more or less than five.

Left push button 94 and right push button 96 disposed at a lower part of first housing 22x of display device 12x illustrated in FIG. 12A are used to move reflecting area 92 from side to side. For example, pressing and holding left push button 94 or right push button 96 moves reflecting area 92 to the left or right with the current number of segments 88 in the reflecting state (that is, the width of reflecting area 92) unchanged.

Next, the adjustment of width of reflecting area 92, which is one of the features of this variation, will be described. In FIG. 12B, the number of segments 88 in reflecting area 92, that is, the width of reflecting area 92 can be increased or decreased in units of one segment 88. That is, operating left push button 94 and right push button 96 allows the adjustment of the width of reflecting area 92. Specifically, a short press on left push button 94 or right push button 96 increases the width to the left or to the right by one segment 88. That is, a short press on left push button 94 causes one segment 88 in the transmitting state immediately adjacent to the left end of reflecting area 92 to be switched to the reflecting state and to be added to reflecting area 92. This increases the width of reflecting area 92 to the left by one segment 88. The width can also be adjusted to the right in the same manner. Moreover, once reflecting area 92 reaches the left end or right end of optical member 38x after short presses on left push button 94 or right push button 96 are repeated, the width decreases every time a short press is performed on left push button 94 or right push button 96. When the width decreases, one segment 88 at the left end or right end of reflecting area 92 is switched to the transmitting state and is added to transmitting areas 90. In this manner, the width of reflecting area 92 can be adjusted freely. Note that, even when the number of segments 88 in the reflecting state has decreased to one, repeating short presses on left push button 94 or right push button 96 increases the number of segments 88 in the reflecting state and thus increases the width of reflecting area 92 again.

As described above, optical member 38x includes the plurality of segments 88 that are equally divided to be arranged in the left-right direction when optical member 38x is viewed from the side receiving the light coming from the back of mobile body 1, and is switchable between the reflecting state and the transmitting state in each of the plurality of segments 88. For example, optical member 38x includes a plurality of liquid crystal portions (not illustrated) that are separate from each other and that respectively correspond to the plurality of segments 88, and thereby is switchable between the reflecting state and the transmitting state in each of the plurality of segments 88. Each of the plurality of liquid crystal portions has a configuration similar to that of liquid crystal portion 48.

Moreover, when an area including two or more consecutive segments 88, in the plurality of segments 88, that are in the reflecting state is defined as reflecting area 92, reflecting area 92 is movable in units of one segment 88 in the plurality of segments 88 in the left-right direction when optical member 38x is viewed from the side receiving the light coming from the back of mobile body 1. As described above, for example, when optical member 38x is viewed from the side receiving the light coming from the back of mobile body 1, a long press on left push button 94 causes segment 88 in the transmitting state immediately adjacent to segment 88 at the left end of reflecting area 92 to be switched to the reflecting state to be added to two or more segments 88 that constitute reflecting area 92, and causes segment 88 at the right end of reflecting area 92 to be switched to the transmitting state to be removed from two or more segments 88 that constitute reflecting area 92. Thus, reflecting area 92 moves to the left in units of one segment 88. Similarly, when optical member 38x is viewed from the side receiving the light coming from the back of mobile body 1, a long press on right push button 96 causes segment 88 in the transmitting state immediately adjacent to segment 88 at the right end of reflecting area 92 to be switched to the reflecting state to be added to two or more segments 88 that constitute reflecting area 92, and causes segment 88 at the left end of reflecting area 92 to be switched to the transmitting state to be removed from two or more segments 88 that constitute reflecting area 92. Thus, reflecting area 92 moves to the right in units of one segment 88.

Moreover, the number of two or more segments 88 that constitute reflecting area 92 can be increased or decreased.

As described above, for example, when optical member 38x is viewed from the side receiving the light coming from the back of mobile body 1, a short press on left push button 94 causes segment 88 in the transmitting state immediately adjacent to segment 88 at the left end of reflecting area 92 to be switched to the reflecting state to be added to two or more segments 88 that constitute reflecting area 92, and thereby increases the number of two or more segments 88 that constitute reflecting area 92. When optical member 38x is viewed from the side receiving the light coming from the back of mobile body 1, the number of two or more segments 88 that constitute reflecting area 92 increases every time a short press is performed on left push button 94 until segment 88 at the left end of the plurality of segments 88 is added to two or more segments 88 that constitute reflecting area 92. When optical member 38x is viewed from the side receiving the light coming from the back of mobile body 1, a short press on left push button 94 after segment 88 at the left end of the plurality of segments 88 is added to two or more segments 88 that constitute reflecting area 92 causes segment 88 at the left end of reflecting area 92 to be switched to the transmitting state to be removed from two or more segments 88 that constitute reflecting area 92. Thus, the number of two or more segments 88 that constitute reflecting area 92 decreases. The number of segments 88 in the reflecting state decreases every time a short press is performed on left push button 94 until the number of segments 88 in the reflecting state becomes one. After the number of segments 88 in the reflecting state becomes one, the number of segments 88 in the reflecting state increases every time a short press is performed on left push button 94, and the number of two or more segments 88 that constitute reflecting area 92 increases as described above.

Moreover, as described above, for example, when optical member 38x is viewed from the side receiving the light coming from the back of mobile body 1, a short press on right push button 96 causes segment 88 in the transmitting state immediately adjacent to segment 88 at the right end of reflecting area 92 to be switched to the reflecting state to be added to two or more segments 88 that constitute reflecting area 92, and thereby increases the number of two or more segments 88 that constitute reflecting area 92. When optical member 38x is viewed from the side receiving the light coming from the back of mobile body 1, the number of two or more segments 88 that constitute reflecting area 92 increases every time a short press is performed on right push button 96 until segment 88 at the right end of the plurality of segments 88 is added to two or more segments 88 that constitute reflecting area 92. When optical member 38x is viewed from the side receiving the light coming from the back of mobile body 1, a short press on right push button 96 after segment 88 at the right end of the plurality of segments 88 is added to two or more segments 88 that constitute reflecting area 92 causes segment 88 at the right end of reflecting area 92 to be switched to the transmitting state to be removed from two or more segments 88 that constitute reflecting area 92. Thus, the number of two or more segments 88 that constitute reflecting area 92 decreases. The number of segments 88 in the reflecting state decreases every time a short press is performed on right push button 96 until the number of segments 88 in the reflecting state becomes one. After the number of segments 88 in the reflecting state becomes one, the number of segments 88 in the reflecting state increases every time a short press is performed on right push button 96, and the number of two or more segments 88 that constitute reflecting area 92 increases as described above.

Display system 10x according to Variation of Embodiment 4 has been described above.

In display system 10x according to Variation of Embodiment 4, optical member 38x includes the plurality of segments 88 that are equally divided to be arranged in the left-right direction when optical member 38x is viewed from the side receiving the light coming from the back of mobile body 1, and is switchable between the reflecting state and the transmitting state in each of the plurality of segments 88. When the area including two or more consecutive segments 88, in the plurality of segments 88, that are in the reflecting state is defined as reflecting area 92, reflecting area 92 is movable in units of one segment 88 in the plurality of segments 88 in the left-right direction when optical member 38x is viewed from the side receiving the light coming from the back of mobile body 1.

With this, the position of reflecting area 92 can be adjusted in the left-right direction in units of one segment 88. Accordingly, the range of the back of mobile body 1 reflected in reflecting area 92 can be optimally adjusted to the angle of optical member 38x changed depending on the physique or the like of the driver (person 2) of mobile body 1.

Moreover, the number of two or more segments 88 that constitute reflecting area 92 can be increased or decreased.

With this, the width of reflecting area 92 can be adjusted in units of one segment 88. Accordingly, the range of the back of mobile body 1 reflected in reflecting area 92 can be optimally adjusted.

Embodiment 5

Figure 13:
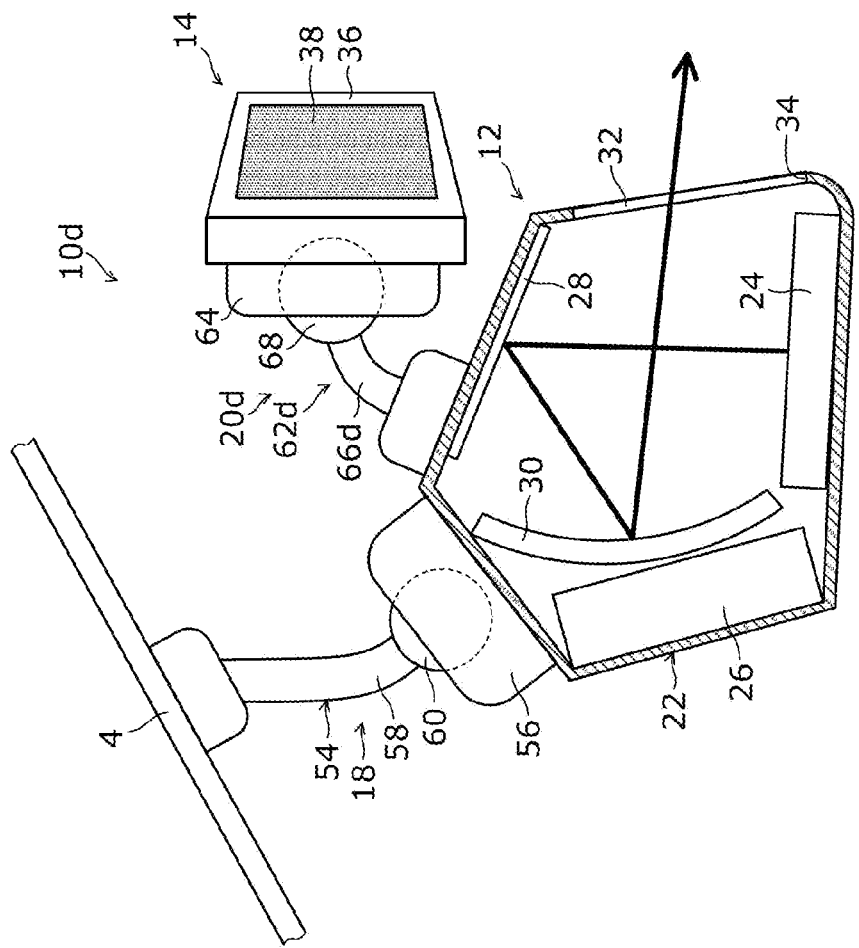
FIG. 13 is a side view of a display system according to Embodiment 5.

FIG. 13 is a side view of display system 10d according to Embodiment 5. In FIG. 13, display system 10d is in the first mode, and optical member 38 is stippled so that it is easily recognized that optical member 38 is in the transmitting state. Moreover, in FIG. 13, first housing 22 is illustrated in cross section.

As illustrated in FIG. 13, display system 10d according to Embodiment 5 mainly differs from display system 10 in including second support structure 20d instead of second support structure 20.

Second support structure 20d mainly differs from second support structure 20 in including third member 62d instead of third member 62. Third member 62d is a component separate from first member 54 and is secured to first housing 22. Specifically, third member 62d includes stud portion 66d, and stud portion 66d is secured to an upper part of first housing 22.

Optical member 38 is located above emission portion 34.

Display system 10d according to Embodiment 5 has been described above.

In display system 10d according to Embodiment 5, third member 62d is secured to first housing 22.

With this, emission portion 34 and optical member 38 can be disposed closer to each other. This causes the light coming from the back of mobile body 1 and reflected by optical member 38 to be more easily visible when display system 10d switches from the first mode to the second mode, and causes the first image light emitted through emission portion 34 to be more easily visible when display system 10d switches from the second mode to the first mode. Thus, a reduction in usability is further prevented.

Embodiment 6

Figure 14:
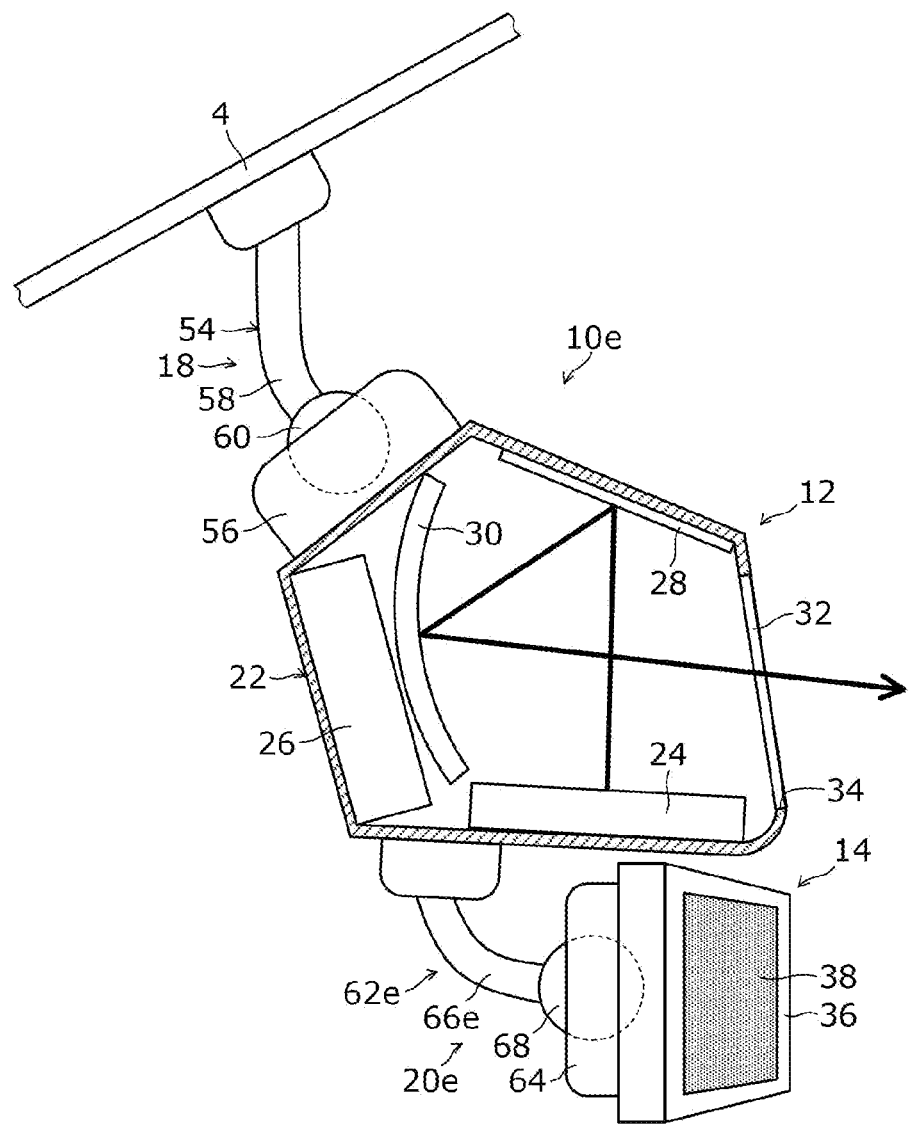
FIG. 14 is a side view of a display system according to Embodiment 6.

FIG. 14 is a side view of display system 10e according to Embodiment 6. In FIG. 14, display system 10e is in the first mode, and optical member 38 is stippled so that it is easily recognized that optical member 38 is in the transmitting state. Moreover, in FIG. 14, first housing 22 is illustrated in cross section.

As illustrated in FIG. 14, display system 10e according to Embodiment 6 mainly differs from display system 10 in including second support structure 20e instead of second support structure 20.

Second support structure 20e mainly differs from second support structure 20 in including third member 62e instead of third member 62. Third member 62e is a component separate from first member 54 and is secured to first housing 22. Specifically, third member 62e includes stud portion 66e, and stud portion 66e is secured to a lower part of first housing 22.

Optical member 38 is located below emission portion 34.

Display system 10e according to Embodiment 6 has been described above.

In display system 10e according to Embodiment 6, third member 62e is secured to first housing 22.

With this, emission portion 34 and optical member 38 can be disposed closer to each other. This causes the light coming from the back of mobile body 1 and reflected by optical member 38 to be more easily visible when display system 10e switches from the first mode to the second mode, and causes the first image light emitted through emission portion 34 to be more easily visible when display system 10e switches from the second mode to the first mode. Thus, a reduction in usability is further prevented.

Embodiment 7

Figure 15:
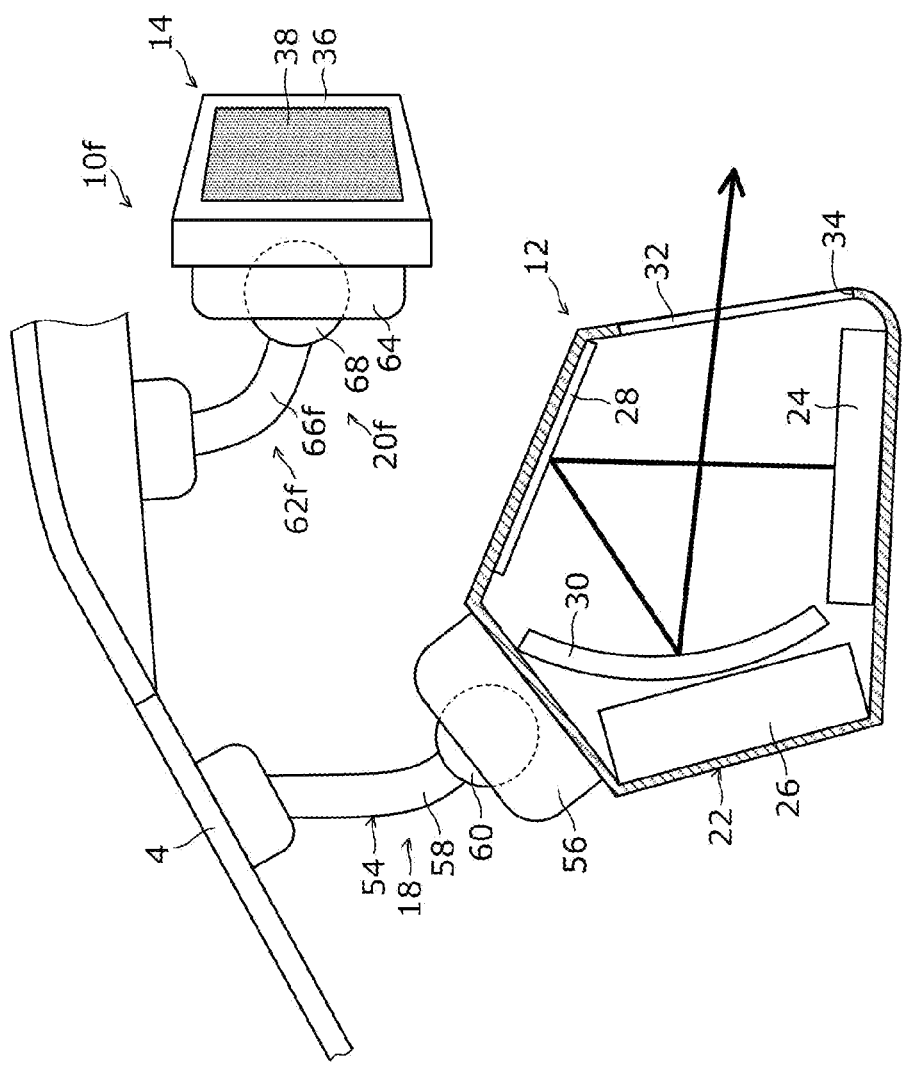
FIG. 15 is a side view of a display system according to Embodiment 7.

FIG. 15 is a side view of display system 10f according to Embodiment 7. In FIG. 15, display system 10f is in the first mode, and optical member 38 is stippled so that it is easily recognized that optical member 38 is in the transmitting state. Moreover, in FIG. 15, first housing 22 is illustrated in cross section.

As illustrated in FIG. 15, display system 10f according to Embodiment 7 mainly differs from display system 10 in including second support structure 20f instead of second support structure 20.

Second support structure 20f mainly differs from second support structure 20 in including third member 62f instead of third member 62. Third member 62f is a component separate from first member 54 and is secured to the roof of mobile body 1. Specifically, third member 62f includes stud portion 66f, and stud portion 66f is secured to the roof of mobile body 1. Thus, first housing 22 and second housing 36 are respectively secured to mobile body 1 through first member 54 and third member 62f spaced from each other. That is, first member 54 and third member 62f are spaced from each other, first housing 22 is secured to mobile body 1 through first member 54, and second housing 36 is secured to mobile body 1 through third member 62*f*. Third member 62*f* is located rearward of first member 54 in the direction along the length of mobile body 1.

With this, optical member 38 is located rearward of emission portion 34 and first housing 22 in the direction along the length of mobile body 1. That is, optical member 38 is located closer to person 2 than emission portion 34 and first housing 22 are.

Display system 10*f* according to Embodiment 7 has been described above.

In display system 10*f* according to Embodiment 7, first housing 22 and second housing 36 are respectively secured to mobile body 1 through first member 54 and third member 62*f* spaced from each other. Third member 62*f* is located rearward of first member 54 in the direction along the length of mobile body 1.

This reduces weight load on first member 54 and second member 56 and thus eliminates or minimizes blur to the image and the reflected image caused by vibration of mobile body 1. This further prevents a reduction in usability.

Embodiment 8

Figure 16:
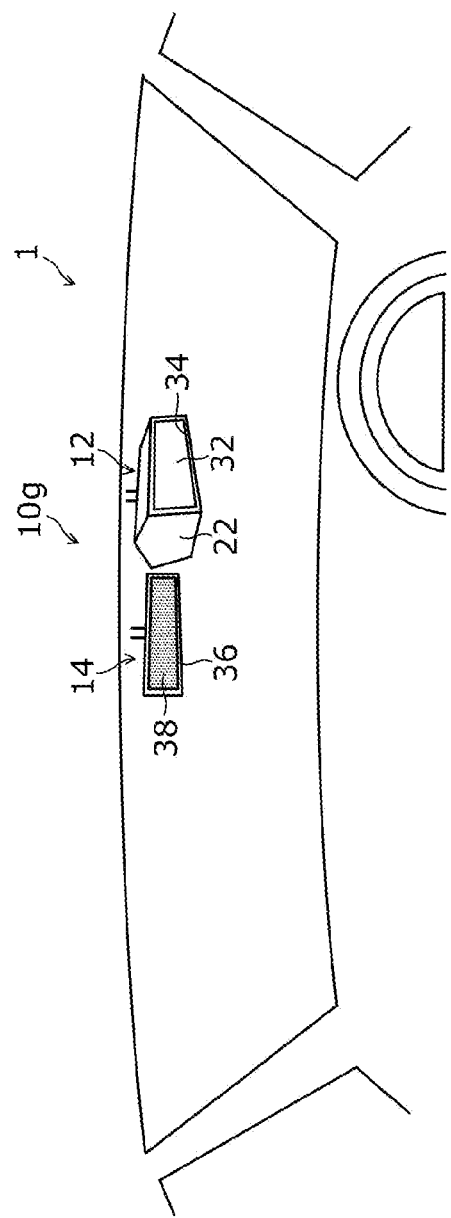
FIG. 16 is a schematic diagram of a display system according to Embodiment 8.

FIG. 16 is a front view of display system 10*g* according to Embodiment 8.

As illustrated in FIG. 16, display system 10*g* according to Embodiment 8 mainly differs from display system 10*f* in that optical member 38 is located substantially in the middle of mobile body 1 as viewed along the width of mobile body 1 and that emission portion 34 is located on the right of second housing 36 as viewed along the width of mobile body 1. Note that the state where optical member 38 is located substantially in the middle of mobile body 1 as viewed along the width of mobile body 1 refers to a state where, for example, at least a part of optical member 38 is located in the middle of mobile body 1 as viewed along the width of mobile body 1.

Emission portion 34 is located on the right of optical member 38 as viewed along the width of mobile body 1. Note that, for example, emission portion 34 may be located on the left of second housing 36 or on the left of optical member 38 as viewed along the width of mobile body 1.

Display system 10*g* according to Embodiment 8 has been described above.

In display system 10*g* according to Embodiment 8, optical member 38 is located substantially in the middle of mobile body 1 as viewed along the width of mobile body 1, and emission portion 34 is located on the right of second housing 36 as viewed along the width. With this, first housing 22 including emission portion 34 and second housing 36 are separate from each other. This reduces weight load on first member 54 and second member 56 and thus eliminates or minimizes blur to the image and the reflected image caused by vibration of mobile body 1. This further prevents a reduction in usability.

Embodiment 9

Figure 17:
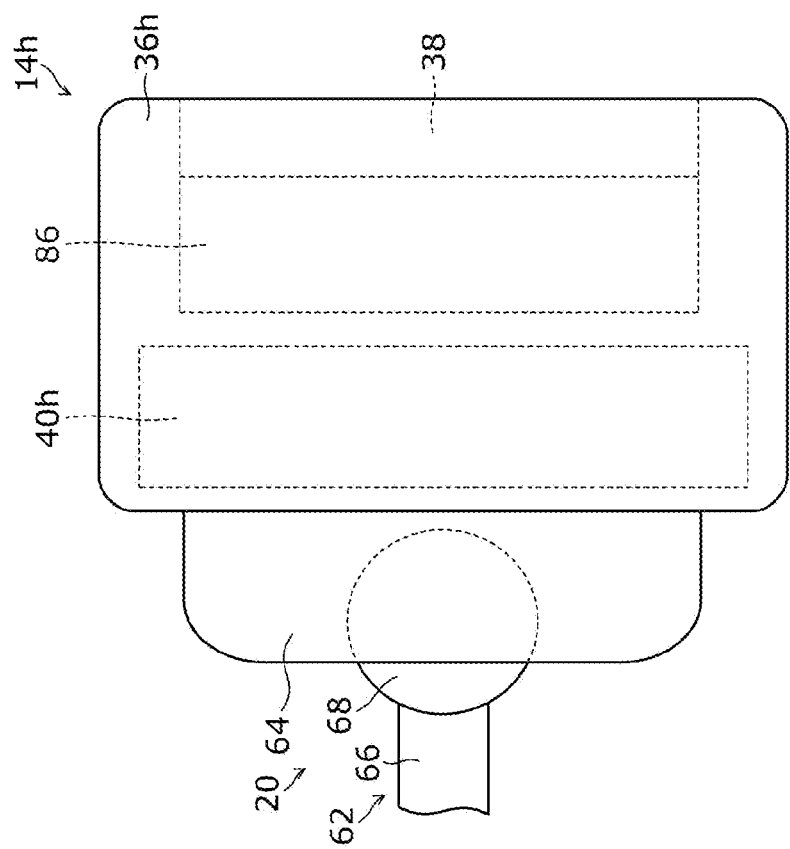
FIG. 17 is a side view of an optical device according to Embodiment 9.

FIG. 17 is a side view of optical device 14*h* according to Embodiment 9.

As illustrated in FIG. 17, the display system according to Embodiment 9 mainly differs from display system 10 in including optical device 14*h* instead of optical device 14.

Optical device 14*h* mainly differs from optical device 14 in including second housing 36*h* instead of second housing 36, in including drive board 40*h* instead of drive board 40, in not including light absorbing member 42, and in including second display member 86.

Second housing 36*h* holds optical member 38, drive board 40*h*, and second display member 86, and accommodates optical member 38, drive board 40*h*, and second display member 86.

Drive board 40*h* is used to drive optical member 38 and second display member 86.

Second display member 86 is a display element emitting second image light that forms a second image. Second display member 86 emits the second image light to display the second image. For example, the second image is an image captured by an imager (not illustrated) that captures the image of the interior of mobile body 1. For example, the imager is a camera installed inside mobile body 1. Note that, for example, the second image may be an image indicating the speed of mobile body 1, results of detection of an object approaching mobile body 1, information about navigation from the current location of mobile body 1 to the destination, or the like. For example, second display member 86 is implemented by including an LCD (Liquid Crystal Display), an organic EL (Electro Luminescence) display, a micro LED (Light Emitting Diode) display, or the like.

Second display member 86 is located on the side of optical member 38 opposite the side receiving the light coming from the back of mobile body 1, and emits the second image light toward optical member 38 such that the second image light passes through optical member 38 and exits from optical member 38 when optical member 38 is in the transmitting state.

Optical member 38 faces person 2 in mobile body 1, and the second image light passing through optical member 38 is visible to person 2. Thus, person 2 in mobile body 1 can view the second image.

The display system according to Embodiment 9 has been described above.

In the display system according to Embodiment 9, optical device 14*h* includes second display member 86 that is located on the side of optical member 38 opposite the side receiving the light coming from the back of mobile body 1 and that emits the second image light forming the second image toward optical member 38 such that the second image light passes through optical member 38 and exits from optical member 38 when optical member 38 is in the transmitting state.

With this, the second image including various content can be viewed through optical member 38. This further prevents a reduction in usability.

Embodiment 10

Figure 18:
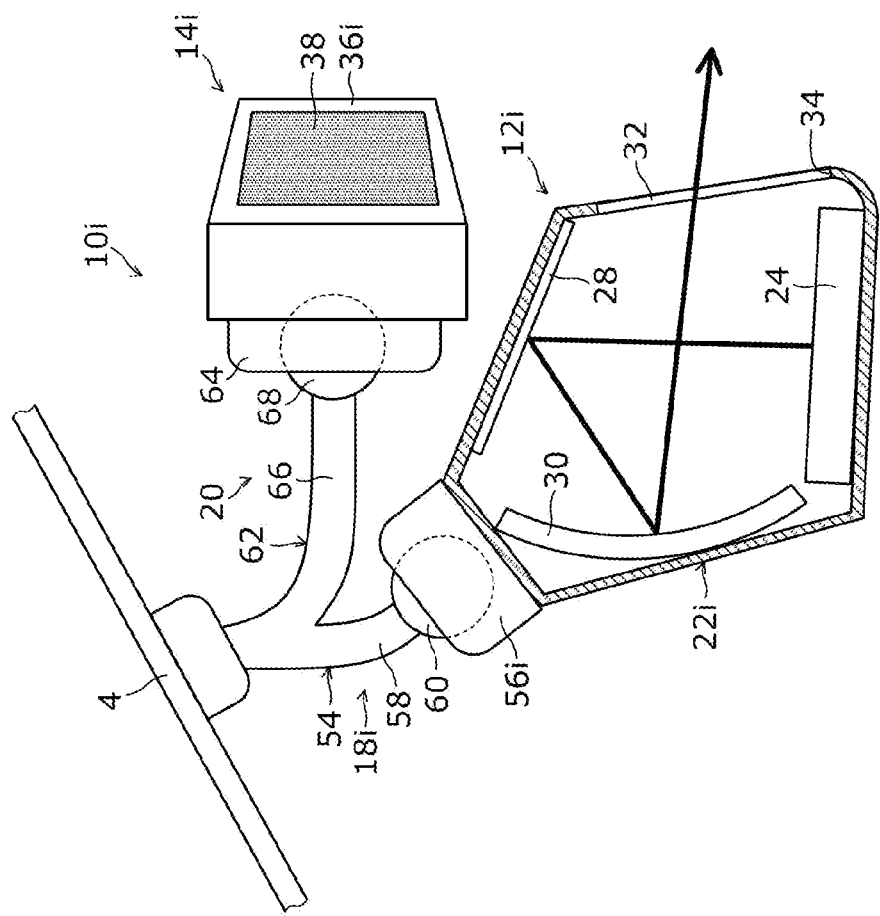
FIG. 18 is a side view of a display system according to Embodiment 10.
Figure 19:
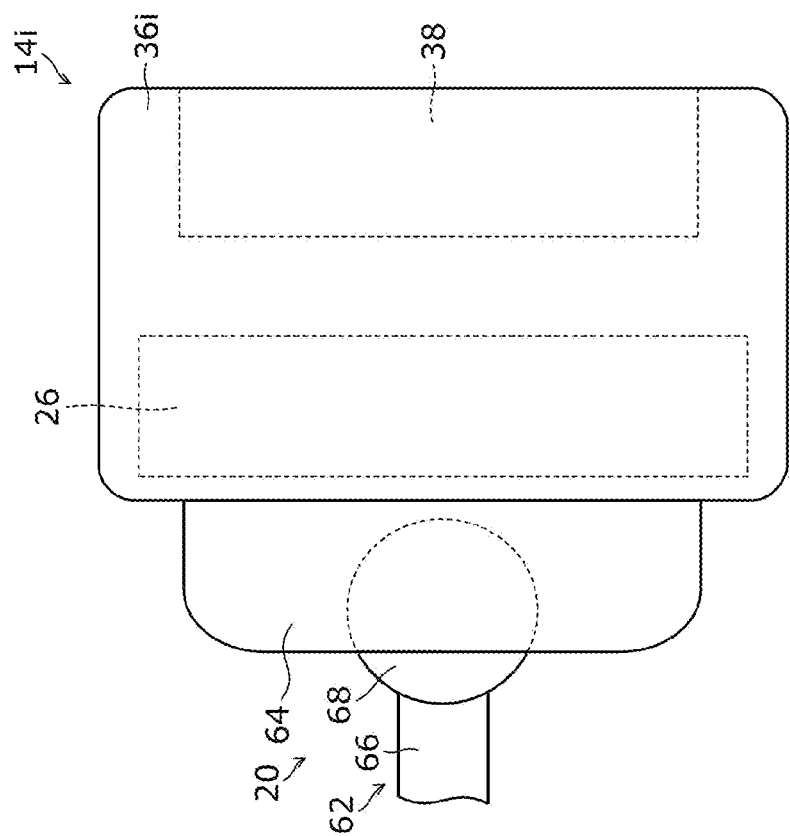
FIG. 19 is a side view of an optical device in the display system in FIG. 18.

FIG. 18 is a front view of display system 10*i* according to Embodiment 10. FIG. 19 is a side view of optical device 14*i* in display system 10*i* in FIG. 18. In FIG. 18, display system 10*i* is in the first mode, and optical member 38 is stippled so that it is easily recognized that optical member 38 is in the transmitting state. Moreover, in FIG. 18, first housing 22 is illustrated in cross section.

As illustrated in FIG. 18, display system 10*i* according to Embodiment 10 mainly differs from display system 10 in including display device 12*i* instead of display device 12, in including optical device 14*i* instead of optical device 14, and in including first support structure 18*i* instead of first support structure 18.

Display device 12i mainly differs from display device 12 in including first housing 22i different from first housing 22. First housing 22i does not hold drive board 26 and is smaller than first housing 22.

Optical device 14i mainly differs from optical device 14 in including second housing 36i different from second housing 36. Second housing 36i holds drive board 26 and is larger than second housing 36.

In this embodiment, drive board 26 is used to drive not only first display member 24 but optical member 38 and is held by second housing 36i.

For example, drive board 26 is electrically connected to first display member 24 through wires accommodated in first member 54, second member 56i, third member 62, and fourth member 64.

Instead of second member 56, first support structure 18i includes second member 56i smaller than second member 56.

Display system 10i according to Embodiment 10 has been described above.

In the display system according to Embodiment 10, display device 12i includes drive board 26 that drives first display member 24 and that is held by second housing 36i.

With this, drive board 26 is held by second housing 36i, and thereby the size of first housing 22i is minimized. This prevents a reduction in usability caused by an increase in the size of first housing 22i.

Embodiment 11

Figure 20:
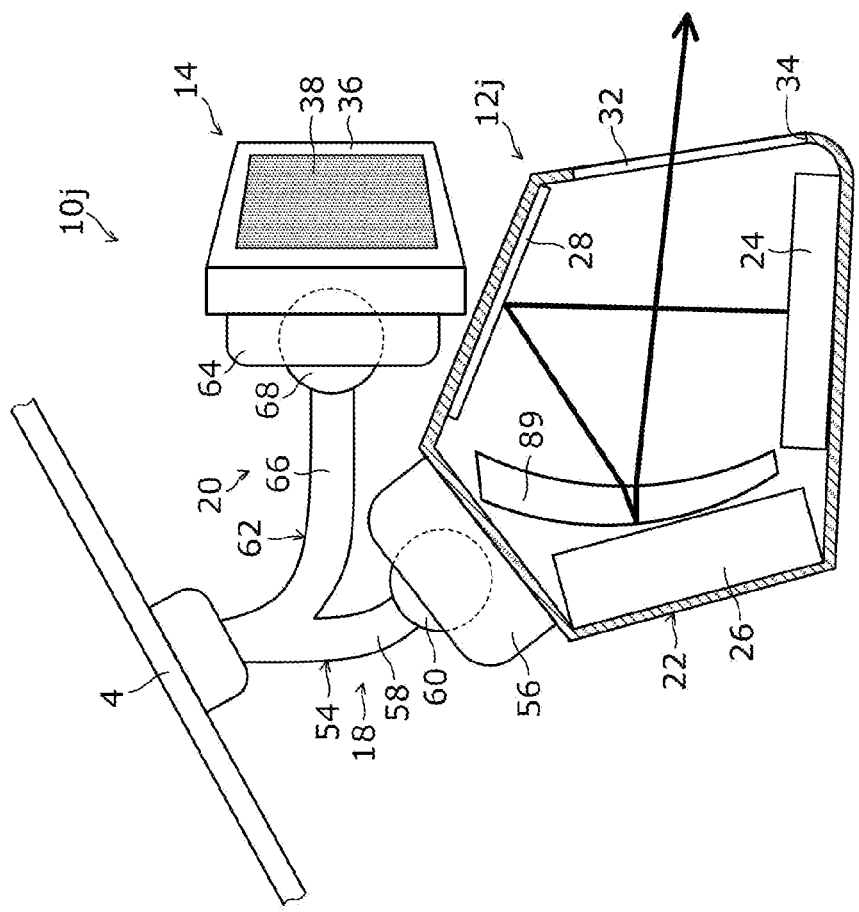
FIG. 20 is a side view of a display system according to Embodiment 11.

FIG. 20 is a side view of display system 10j according to Embodiment 11.

As illustrated in FIG. 20, display system 10j according to Embodiment 11 mainly differs from display system 10 in including display device 12j instead of display device 12.

Display device 12j mainly differs from display device 12 in including optical member 89 instead of concave mirror 30.

Optical member 89 is an optical element that causes light reflected by plane mirror 28 to enter optical member 89 from a main surface on one side of optical member 89, that reflects the light entering optical member 89 from a main surface on another side of optical member 89, and that causes the light reflected from the main surface on the other side of optical member 89 to exit from the main surface on the one side of optical member 89. Here, the main surface on the one side of optical member 89 and the main surface on the other side have curvatures different from each other. In the configuration in FIG. 20, the curvature of the main surface on the one side is smaller than the curvature of the main surface on the other side.

The light traveling from optical member 89 passes through cover 32 and is emitted to the outside of first housing 22 (see a thick solid line arrow in FIG. 20) to be visible to person 2. At this moment, with the above-described configuration of optical member 89, the image formed by the light entering optical member 89 is enlarged when emitted. Thus, the virtual image visible to person 2 can be enlarged.

Display system 10j according to Embodiment 11 has been described above.

Embodiment 12

The configuration diagram of display system 10 according to Embodiment 12 is the same as that of Embodiment 1 in FIG. 2.

A distinctive feature in Embodiment 12 is that display system includes, in addition to the first mode and the second mode, a fifth mode where display device 12 is in the emitting state while optical member 38 is in the reflecting state and that the operation receiver (push button 16) switches display system 10 between the first mode, the second mode, and the fifth mode. That is, the operation receiver (push button 16) further receives an operation for switching display system 10 to the fifth mode where display device 12 is in the emitting state while optical member 38 is in the reflecting state. When display system 10 is in the fifth mode, the image from display device 12 is emitted while optical member 38 reflects the rear view of the mobile body, in particular, a back seat. Accordingly, person 2 can view both the image and the rear view (back seat).

To switch display system 10 between the first mode, the second mode, and the fifth mode, for example, the operation receiver (push button 16) may receive a short press to switch display system between the first mode and the second mode and may receive a long press to switch display system 10 to the fifth mode. Moreover, for example, display system 10 may be switched between the first mode, the second mode, and the fifth mode in this order every time the operation receiver (push button 16) is pressed. Moreover, for example, the operation receiver may be a three-position slide switch, and the first mode, the second mode, and the fifth mode may be selected according to the slide position.

Display system 10 according to Embodiment 12 has been described above.

In display system 10 according to Embodiment 12, the operation receiver (push button 16) further receives the operation for switching display system 10 to the fifth mode where display device 12 is in the emitting state while optical member 38 is in the reflecting state.

With this, display system 10 can be switched to the fifth mode at the request of person 2 in mobile body 1 to cause optical member 38 to be in the reflecting state at all times. Thus, person 2 can observe occupants in the back seats. This further prevents a reduction in usability.

Embodiment 13

Figure 21A:
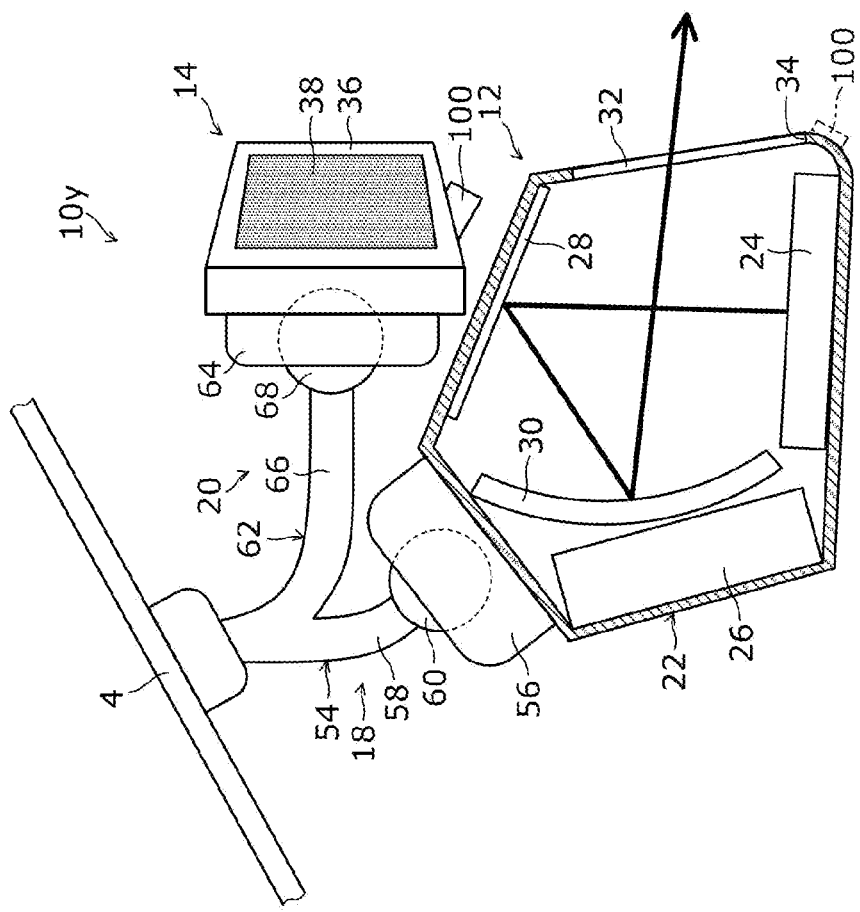
FIG. 21A is a side view of a display system according to Embodiment 13.

FIG. 21A is a side view of display system 10y according to Embodiment 13. FIG. 21B is a front view of display system 10y in FIG. 21A. In FIG. 21B, cover 32 is removed, and first display member 24 is not illustrated.

In the configuration in FIGS. 21A and 21B, elements identical to those in FIGS. 2 and 3 will be referenced by the same designators, and the detailed explanations will be omitted. The distinctive configuration in this embodiment is that indoor camera 100 that captures the image of the interior of mobile body 1 is disposed on at least either first housing 22 or second housing 36 and that the image of indoor camera 100 is displayed by first display member 24. The distinctive feature in this embodiment will now be described in detail.

First, as illustrated in the side view of display system 10y in FIG. 21A and the front view of display system 10y in FIG. 21B, indoor camera 100 is disposed on the lower side of second housing 36. The angle of indoor camera 100 is adjusted such that indoor camera 100 can capture the image of the driver's seat, the passenger seat, or a back seat. With this, a part of the interior, for example, a back seat desired to be viewed by person 2 can be captured.

Note that indoor camera 100 may be disposed on the lower side of first housing 22 as indicated by dash-dot-dot lines in FIGS. 21A and 21B.

Moreover, indoor camera 100 may be disposed on both the lower side of first housing 22 and the lower side of second housing 36. In this case, two parts of the interior (for example, the back seats on the left and right) desired to be viewed by person 2 can be captured at the same time.

The image captured by indoor camera 100 is displayed by first display member 24. That is, the first image includes the image captured by indoor camera 100. For example, first display member 24 may display the first image such that three quarters of the first image is occupied by rear camera image 102 (image captured by a camera (not illustrated) disposed at the back of mobile body 1 to capture the image of the back) and such that the remaining one quarter of the first image is occupied by indoor camera image 104 captured by indoor camera 100. FIG. 21B illustrates such a display example. Note that cover 32 is removed in FIG. 21B. Accordingly, concave mirror 30 can be seen at the back of first housing 22. Note that first display member 24, which is disposed on the bottom surface of first housing 22, is not illustrated in FIG. 21B. As illustrated in FIG. 21B, rear camera image 102 and indoor camera image 104 displayed by first display member 24 are displayed in concave mirror 30 at an area ratio of three to one. Thus, person 2 can view indoor camera image 104 arranged in parallel at the left end while mainly viewing rear camera image 102 of mobile body 1. As a result, person 2 can see, for example, a child sitting in a back seat, using indoor camera image 104 displayed simultaneously with rear camera image 102. At this moment, rear camera image 102 and indoor camera image 104 are both visible to person 2 as virtual images and thus can be displayed simultaneously to be viewed without causing person 2 looking forward through the windshield to change the focus of the eye significantly.

Note that rear camera image 102 is displayed on a side closer to person 2 (on the right in FIG. 21B on the assumption that mobile body 1 is a right-hand drive car), whereas indoor camera image 104 is displayed on a side away from person 2 (on the left in FIG. 21B). Rear camera image 102 is displayed on the side closer to person 2 to be viewed by person 2 easily because person 2 frequently views rear camera image 102 during driving. Moreover, for the same reason, the area of rear camera image 102 is larger than the area of indoor camera image 104 to be viewed by person 2 easily.

Moreover, in a case where indoor cameras 100 are on both the lower side of first housing 22 and the lower side of second housing 36, indoor camera image 104 may be, for example, divided into an upper part and a lower part. For example, one of the upper part and the lower part of indoor camera image 104 may be the image captured by indoor camera 100 disposed on first housing 22, and the other may be the image captured by indoor camera 100 disposed on second housing 36.

Although indoor camera 100 is disposed on at least first housing 22 or second housing 36 in the above-described configuration, the configuration is not limited to this. Indoor camera 100 may be disposed on other parts inside mobile body 1, for example, on the roof of mobile body 1 and/or the rear surface of the backrest of a seat (in particular, a front seat). In a case where indoor camera 100 is disposed on the roof, indoor camera 100 may be positioned to face a back seat to capture the image. Moreover, in a case where indoor camera 100 is disposed on the rear surface of the backrest of a front seat (for example, on the bezel of a monitor for a back seat), disposing one indoor camera 100 on the rear surface of the backrest of each of the front seats on the left and the right enables images showing what is happening in the back seats on the left and the right to be captured. Thus, indoor camera 100 may be disposed on at least first housing 22, second housing 36, the roof of mobile body 1, or the rear surface of the backrest of a seat in mobile body 1. Note that indoor cameras 100 may be disposed on all of first housing 22, second housing 36, the roof of mobile body 1, and the rear surface of the backrest of a seat in mobile body 1. In this case, person 2 can view all of the images using indoor camera image 104. Moreover, images to be viewed may be selectable according to the preference of person 2.

Moreover, although display system 10y includes both display device 12 and optical device 14 in this embodiment, display system 10y may not necessarily include optical device 14 because the image of indoor camera 100 can be displayed on display device 12. Thus, a display system including only display device 12 capable of displaying virtual images also enables simultaneous view of rear camera image 102 and indoor camera image 104 without causing significant change in the focus of the eye.

Display system 10y according to Embodiment 13 has been described above.

Display system 10y according to Embodiment 13 includes indoor camera 100 disposed on at least first housing 22, second housing 36, the roof of mobile body 1, or the rear surface of the backrest of a seat in mobile body 1 to capture the image of the interior of mobile body 1. The first image includes the image captured by indoor camera 100.

With this, the image captured by indoor camera 100 is also displayed by display device 12 as a virtual image. Accordingly, the indoor image becomes more easily visible to the driver (person 2).

OTHER EMBODIMENTS

Although a display system according to one or more aspects of the present disclosure has been described based on embodiments, the present disclosure is not limited to the embodiments. Those skilled in the art will readily appreciate that embodiments arrived at by making various modifications to the above embodiments or embodiments arrived at by selectively combining elements disclosed in the above embodiments without materially departing from the scope of the present disclosure may be included within one or more aspects of the present disclosure.

In the above-described embodiments, display device 12 is switched to the emitting state when first display member 24 is powered on and emits the first image light, and is switched to the non-emitting state when first display member 24 is powered off and does not emit the first image light. However, the embodiments are not limited to this.

For example, cover 32 may be switched to a transmitting state where cover 32 allows the first image light to pass through cover 32 by receiving voltage and may be switched to a non-transmitting state where cover 32 does not allow the first image light to pass through cover 32 by not receiving voltage. In this case, for example, while first display member 24 is powered on, display device 12 may be switched to the emitting state as cover 32 be switched to the transmitting state by receiving voltage, and may be switched to the non-emitting state as cover 32 is switched to the non-transmitting state by not receiving voltage.

Moreover, for example, a light shielding member that is movable between a position where the light shielding member covers emission portion 34 and a position where the light shielding member does not cover emission portion 34 may be provided. In this case, for example, while first display member 24 is powered on, display device 12 may be switched to the emitting state as the light shielding member moves to the position where the light shielding member does not cover emission portion 34, and may be switched to the non-emitting state as the light shielding member moves to the position where the light shielding member covers emission portion 34.

Moreover, in the above-described embodiments, optical member 38 is switched to the transmitting state by receiving voltage and is switched to the reflecting state by not receiving voltage. However, the embodiments are limited to this.

For example, the optical member may include a transmissive member that allows the light coming from the back of mobile body 1 to pass through the transmissive member and a reflective member that is movable between a position where the reflective member covers the transmissive member and a position where the reflective member does not cover the transmissive member and that reflects the light coming from the back of mobile body 1. In this case, for example, the optical member is switched to the transmitting state as the reflective member moves to the position where the reflective member does not cover the transmissive member, and may be switched to the reflecting state as the reflective member moves to the position where the reflective member covers the transmissive member.

Moreover, in the above-described embodiments, the operation receiver is single push button 16. However, the embodiments are not limited to this.

For example, the operation receiver may be a single touch button. In this case, the first operation and the second operation are operations of touching the touch button.

Moreover, the operation receiver may be a single knob. In this case, for example, the first operation may be an operation of turning the knob in one direction, and the second operation may be an operation of turning the knob in another direction.

Moreover, for example, the operation receiver may include a first operation receiver and a second operation receiver that are separate from each other, and each of the first operation receiver and the second operation receiver may be a single member including a single push button, a single touch button, and a single knob.

Moreover, in the above-described embodiments, the third operation receiver and the fourth operation receiver are integrally formed and are single push button 74 (76, 78). However, the embodiments are not limited to this.

For example, the third operation receiver and the fourth operation receiver may be integrally formed and may be a single touch button or a single knob.

Moreover, for example, the third operation receiver and the fourth operation receiver may be separate from each other, and each of the third operation receiver and the fourth operation receiver may be a single member including a single push button, a single touch button, and a single knob.

SUPPLEMENTARY NOTE

The above-described embodiments and the like disclose the following techniques.

(Technique 1)

A display system provided to a mobile body, the display system comprising:
 a display device including an emission portion through which first image light forming a first image is emitted from the display device, the display device being switchable between (i) an emitting state where the first image light is allowed to be emitted from the display device through the emission portion and (ii) a non-emitting state where the first image light is not allowed to be emitted from the display device through the emission portion;
 an optical device including an optical member, the optical member being switchable between (i) a reflecting state where the optical member reflects light coming from a back of the mobile body and (ii) a transmitting state where the light coming from the back of the mobile body passes through the optical member; and
 an operation receiver that receives an operation for switching the display system between (i) a first mode where the display device is in the emitting state while the optical member is in the transmitting state and (ii) a second mode where the display device is in the non-emitting state while the optical member is in the reflecting state.

(Technique 2)

The display system according to technique 1, wherein the operation receiver includes:
 a first operation receiver that receives, as the operation, a first operation for switching the display system to the first mode; and
 a second operation receiver that receives, as the operation, a second operation for switching the display system to the second mode.

(Technique 3)

The display system according to technique 1, wherein the operation receiver is a single push button.

(Technique 4)

The display system according to any one of techniques 1 to 3, wherein
 the display device includes:
  a first display member that emits the first image light;
  a concave mirror that reflects the first image light emitted from the first display member; and
  a first housing that includes the emission portion and that holds the first display member and the concave mirror,
 the optical device further includes:
  a second housing that holds the optical member, the second housing being different from the first housing, and
 the first image light is emitted from the first display member, then reflected on the concave mirror, and allowed to be emitted from the display device through the emission portion.

(Technique 5)

The display system according to technique 4, further comprising:
 a first support structure including a first member and a second member, the second member engaging with the first member to be pivotable on the first member and being secured to the first housing; and
 a second support structure including a third member and a fourth member, the fourth member engaging with the third member to be pivotable on the third member and being secured to the second housing.

(Technique 6)

The display system according to technique 5, wherein the first member and the third member are integrally formed.

(Technique 7)

The display system according to technique 5, wherein the third member is secured to the first housing.

(Technique 8)
The display system according to technique 5, wherein
the first housing and the second housing are secured to the mobile body through the first member and the third member, respectively, which are spaced from each other, and
the third member is located rearward of the first member in the direction along the length the mobile body.

(Technique 9)
The display system according to any one of techniques 4 to 7, wherein
the optical member is located substantially in a middle of the mobile body as viewed along a width of the mobile body, and
the emission portion is located on left or on right of the second housing as viewed along the width of the mobile body.

(Technique 10)
The display system according to any one of techniques 4 to 9, wherein
the display device includes a drive board, the drive board driving the first display member and being held by the second housing.

(Technique 11)
The display system according to any one of techniques 1 to 10, wherein
the optical device further includes a light absorbing member that absorbs the light coming from the back of the mobile body and passing through the optical member when the optical member is in the transmitting state.

(Technique 12)
The display system according to any one of techniques 1 to 10, wherein
the optical device further includes interior material that is visible through the optical member when the optical member is in the transmitting state.

(Technique 13)
The display system according to any one of techniques 1 to 10, wherein
light coming from a front of the mobile body passes through the optical member when the optical member is in the transmitting state.

(Technique 14)
The display system according to technique 13, wherein
the optical device further includes a holding member, the holding member being provided only at a part of an edge portion of the optical member, the holding member holding the optical member, the edge portion being a portion of a side receiving the light coming from the back of the mobile body.

(Technique 15)
The display system according to any one of techniques 1 to 10, wherein
the optical member includes a first side receiving the light coming from the back of the mobile body and a second side opposite to the first surface,
the optical device further includes a second display member facing the second side of the optical member, the second display member being a member that emits second image light forming a second image toward the optical member to allow the second image light to pass through the optical member to exit from the optical member when the optical member is in the transmitting state.

(Technique 16)
The display system according to any one of techniques 1 to 15, wherein
the optical member includes a plurality of areas each being switchable between the reflecting state and the transmitting state,
the display system further comprises:
a plurality of third operation receivers each of which corresponds to a corresponding area of the plurality of areas and receives a single third operation for switching the corresponding area to the reflecting state; and
a plurality of fourth operation receivers each of which corresponds to a corresponding area of the plurality of areas and receives a single fourth operation for switching the corresponding area to the transmitting state,
when the display system is in the first mode, the display device is in the emitting state, and all of the plurality of areas are in the transmitting state,
when the display system is in the second mode, the display device is in the non-emitting state, and all of the plurality of areas are in the reflecting state,
when at least one third operation receiver of the plurality of third operation receivers receives the single third operation while the display system is in the first mode, at least one area corresponding to the at least one third operation receiver among the plurality of areas is switched to the reflecting state so that the display system is switched from the first mode to a third mode where the display device is in the emitting state while at least one of the plurality of areas is in the reflecting state, and
when at least one fourth operation receiver corresponding to the at least one area among the plurality of fourth operation receivers receives the single fourth operation while the display system is in the third mode, the at least one area is switched to the transmitting state.

(Technique 17)
The display system according to any one of techniques 1 to 15, wherein
the optical member includes a plurality of segments, the plurality of segments being equally divided to be arranged in a left-right direction when the optical member is viewed from a side receiving the light coming from the back of the mobile body, the plurality of segments each being switchable between the reflecting state and the transmitting state, and
when the plurality of segments include a reflecting area consisting of two or more consecutive segments each being in the reflecting state, the reflecting area is movable in units of one segment in the left-right direction when the optical member is viewed from the side receiving the light coming from the back of the mobile body, the one segment being in the plurality of segments.

(Technique 18)
The display system according to technique 17, wherein
a number of the two or more consecutive segments that constitute the reflecting area is changeable.

(Technique 19)
The display system according to any one of techniques 1 to 18, further comprising:
a controller that causes the display system to be switched to a fourth mode where the display device is in the emitting state while the optical member is in the reflecting state for a predetermined period, when supply of power, to the display system, to operate the display system is turned on from off.

(Technique 20)

The display system according to technique 19, wherein
in a case where the supply of the power to the display system is turned off from on while the display system is in the first mode, the controller causes the display system to be switched to the fourth mode next time the power is supplied to the display system, and then switched to the first mode after the fourth mode, and
in a case where the supply of the power to the display system is turned off from on while the display system is in the second mode, the controller causes the display system to be switched to the fourth mode next time the power is supplied to the display system, and then switched to the second mode after the fourth mode.

(Technique 21)

The display system according to any one of techniques 1 to 20, wherein
the operation receiver further receives an operation for switching the display system to a fifth mode where the display device is in the emitting state while the optical member is in the reflecting state.

(Technique 22)

The display system according to any one of techniques 4 to 10, further comprising:
an indoor camera provided to at least the first housing, the second housing, a roof of the mobile body, or a rear surface of a backrest of a seat in the mobile body, the indoor camera capturing an image of an interior of the mobile body, wherein
the first image includes the image captured by the indoor camera.

While various embodiments have been described herein above, it is to be appreciated that various changes in form and detail may be made without departing from the spirit and scope of the present disclosure as presently or hereafter claimed.

Further Information about Technical Background to this Application

The disclosures of the following patent applications including specification, drawings, and claims are incorporated herein by reference in their entirety: Japanese Patent Application No. 2022-050149 filed on Mar. 25, 2022, and Japanese Patent Application No. 2022-140196 filed on Sep. 2, 2022.

INDUSTRIAL APPLICABILITY

The present disclosure can be used for, for example, display systems for displaying images.

The invention claimed is:

1. A display system provided to a mobile body, the display system comprising:
a display device including a first display member and an emission portion, the emission portion being a portion through which first image light emitted from the first display member and forming a first image is emitted from the display device, the display device being switchable between (i) an emitting state where the first image light is allowed to be emitted from the display device through the emission portion and (ii) a non-emitting state where the first image light is not allowed to be emitted from the display device through the emission portion;
an optical device including an optical member, the optical member (i) being switchable to a reflecting state by not receiving voltage and switchable to a transmitting state by receiving the voltage, or (ii) being switchable to the reflecting state by receiving the voltage and switchable to the transmitting state by not receiving the voltage, the reflecting state being a state where the optical member reflects light coming from a back of the mobile body, the transmitting state being a state where the light coming from the back of the mobile body passes through the optical member; and
an operation receiver that receives an operation for switching the display system between (i) a first mode where the display device is in the emitting state while the optical member is in the transmitting state and (ii) a second mode where the display device is in the non-emitting state while the optical member is in the reflecting state, wherein
the display device further includes:
a concave mirror that reflects the first image light emitted from the first display member; and
a first housing that includes the emission portion and that holds the first display member and the concave mirror, and
the optical device further includes:
a second housing that holds the optical member, the second housing being separated from the first housing.

2. The display system according to claim 1, wherein
the emission portion allows the first image light emitted from the first display member and then indirectly reflected from the concave mirror to travel to an outside of the first housing.

3. The display system according to claim 1, further comprising:
a first support structure including a first member and a second member, the second member engaging with the first member to be pivotable on the first member and being secured to the first housing; and
a second support structure including a third member and a fourth member, the fourth member engaging with the third member to be pivotable on the third member and being secured to the second housing.

4. The display system according to claim 3, wherein
the first member and the third member are integrally formed.

5. The display system according to claim 3, wherein
the third member is secured to the first housing.

6. The display system according to claim 3, wherein
the first housing and the second housing are secured to the mobile body through the first member and the third member, respectively, with the first member being spaced from the third member, and
the third member is located rearward of the first member in a direction along length the mobile body.

7. The display system according to claim 1, wherein
the optical member is located substantially in a middle of the mobile body as viewed along a width of the mobile body, and
the emission portion is located on a left or on a right of the second housing as viewed along the width of the mobile body.

8. The display system according to claim 1, wherein
the display device includes a drive board, the drive board driving the first display member and being held by the second housing.

9. The display system according to claim 1, wherein
the optical device further includes a light absorbing member that absorbs the light coming from the back of the mobile body and passing through the optical member when the optical member is in the transmitting state.

10. The display system according to claim 1, wherein the optical device further includes interior material that is visible through the optical member when the optical member is in the transmitting state.

11. The display system according to claim 1, wherein light coming from a front of the mobile body passes through the optical member to travel towards a person in the mobile body, when the optical member is in the transmitting state.

12. The display system according to claim 11, wherein the optical device further includes a holding member, the holding member being provided only at a part of an edge portion of the optical member, the holding member holding the optical member, the edge portion being a portion of a side receiving the light coming from the back of the mobile body.

13. The display system according to claim 1, wherein the optical member includes a first side receiving the light coming from the back of the mobile body and a second side opposite to the first surface,
the optical device further includes a second display member facing the second side of the optical member, the second display member being a member that emits second image light forming a second image toward the optical member to allow the second image light to pass through the optical member to exit from the optical member when the optical member is in the transmitting state.

14. The display system according to claim 1, wherein the optical member includes a plurality of areas each being switchable between the reflecting state and the transmitting state,
the display system further comprises:
a plurality of third operation receivers each of which corresponds to a corresponding area of the plurality of areas and receives a single third operation for switching the corresponding area to the reflecting state; and
a plurality of fourth operation receivers each of which corresponds to a corresponding area of the plurality of areas and receives a single fourth operation for switching the corresponding area to the transmitting state,
when the display system is in the first mode, the display device is in the emitting state, and all of the plurality of areas are in the transmitting state,
when the display system is in the second mode, the display device is in the non-emitting state, and all of the plurality of areas are in the reflecting state,
when at least one third operation receiver of the plurality of third operation receivers receives the single third operation while the display system is in the first mode, the display system is switched from the first mode to a third mode in which at least one area corresponding to the at least one third operation receiver among the plurality of areas is in the reflecting state and the display device is in the emitting state, and when at least one fourth operation receiver corresponding to the at least one area among the plurality of fourth operation receivers receives the single fourth operation while the display system is in the third mode, the at least one area is switched to the transmitting state.

15. The display system according to claim 1, wherein the optical member includes a plurality of segments, the plurality of segments being equally divided to be arranged in a left-right direction when the optical member is viewed from a side receiving the light coming from the back of the mobile body, the plurality of segments each being switchable between the reflecting state and the transmitting state, and
when the plurality of segments include a reflecting area consisting of two or more consecutive segments each being in the reflecting state, the reflecting area is movable in units of one segment in the left-right direction when the optical member is viewed from the side receiving the light coming from the back of the mobile body, the one segment being in the plurality of segments.

16. The display system according to claim 15, wherein a number of the two or more consecutive segments that constitute the reflecting area is changeable.

17. The display system according to claim 1, further comprising:
a controller that causes the display system to be switched to a fourth mode where the display device is in the emitting state while the optical member is in the reflecting state for a predetermined period, when supply of power, to the display system, to operate the display system is turned on from off.

18. The display system according to claim 17, wherein in a case where the supply of the power to the display system is turned off from on while the display system is in the first mode, the controller causes the display system to be switched to the fourth mode next time the power is supplied to the display system, and then switched to the first mode after the fourth mode, and
in a case where the supply of the power to the display system is turned off from on while the display system is in the second mode, the controller causes the display system to be switched to the fourth mode next time the power is supplied to the display system, and then switched to the second mode after the fourth mode.

19. The display system according to claim 1, wherein the operation receiver further receives an operation for switching the display system to a fifth mode where the display device is in the emitting state while the optical member is in the reflecting state.

20. The display system according to claim 1, further comprising:
an indoor camera provided to one of the first housing, the second housing, a roof of the mobile body, and a rear surface of a backrest of a seat in the mobile body, the indoor camera capturing an image of an interior of the mobile body, wherein
the first image includes the image captured by the indoor camera.

* * * * *